(12) United States Patent
LeBlanc

(10) Patent No.: US 7,970,124 B2
(45) Date of Patent: *Jun. 28, 2011

(54) ADAPTIVE GAIN CONTROL BASED ON ECHO CANCELLER PERFORMANCE INFORMATION

(75) Inventor: Wilfrid LeBlanc, Vancouver (CA)

(73) Assignee: Broadcom Corporation, Irvine, CA (US)

(*) Notice: Subject to any disclaimer, the term of this patent is extended or adjusted under 35 U.S.C. 154(b) by 1176 days.

This patent is subject to a terminal disclaimer.

(21) Appl. No.: 11/621,327

(22) Filed: Jan. 9, 2007

(65) Prior Publication Data

US 2007/0127711 A1 Jun. 7, 2007

Related U.S. Application Data

(63) Continuation of application No. 10/077,133, filed on Feb. 15, 2002, now Pat. No. 7,164,659, which is a continuation-in-part of application No. 09/522,185, filed on Mar. 9, 2000, now Pat. No. 7,423,983, which is a continuation-in-part of application No. 09/493,458, filed on Jan. 28, 2000, now Pat. No. 6,549,587, which is a continuation-in-part of application No. 09/454,219, filed on Dec. 9, 1999, now Pat. No. 6,882,711.

(51) Int. Cl.
*H04M 9/08* (2006.01)

(52) U.S. Cl. ............ 379/406.16; 370/286; 370/289; 375/285; 375/295; 379/406.01; 379/406.08; 714/701

(58) Field of Classification Search ............ 370/286, 370/290, 289; 379/3, 202.01, 388.01, 406.06, 379/406.08, 406.09, 406.16, 406.01; 381/100; 375/285, 295; 714/701
See application file for complete search history.

(56) References Cited

U.S. PATENT DOCUMENTS

| | | | | |
|---|---|---|---|---|
| 4,074,086 A * | 2/1978 | Falconer et al. | ......... | 379/406.08 |
| 4,564,934 A * | 1/1986 | Macchi | ................ | 370/290 |
| 4,600,815 A * | 7/1986 | Horna | ................ | 379/406.08 |
| 4,741,025 A * | 4/1988 | Maruyama et al. | ...... | 379/202.01 |
| 4,998,241 A | 3/1991 | Brox et al. | | |
| 5,099,472 A | 3/1992 | Townsend et al. | | |
| 5,577,097 A * | 11/1996 | Meek | ................ | 379/3 |
| 5,612,996 A * | 3/1997 | Li | ................ | 379/406.06 |
| 5,745,564 A * | 4/1998 | Meek | ................ | 379/406.08 |
| 5,970,137 A * | 10/1999 | Le Damany et al. | ..... | 379/388.01 |
| 6,185,300 B1 * | 2/2001 | Romesburg | ............ | 379/406.09 |
| 6,201,873 B1 * | 3/2001 | Dal Farra | ................ | 381/100 |
| 6,487,178 B1 * | 11/2002 | Romesburg et al. | ......... | 370/286 |
| 7,164,659 B2 * | 1/2007 | LeBlanc | ................ | 370/286 |

(Continued)

FOREIGN PATENT DOCUMENTS

EP   1 152 547 A2   11/2001

*Primary Examiner* — Gerald Gauthier

(74) *Attorney, Agent, or Firm* — McAndrews, Held & Malloy, Ltd.

(57) ABSTRACT

A system and method for provide a stable gain from an adaptive gain control device in a signal path. An echo canceller is also located in the signal path, and is used to provide performance information regarding losses in the signal. This performance information is fed to the automatic gain control device via a connection. The automatic gain control device thereafter uses the performance information to determine a maximum gain that might be provided based upon losses cause by echo conditions. The gain however is limited in order to provide for a stable system. The performance information includes a loss rate that includes a combination of the echo return loss and the echo return loss enhancement.

5 Claims, 16 Drawing Sheets

U.S. PATENT DOCUMENTS

| | | | |
|---|---|---|---|
| 7,403,610 B2 * | 7/2008 | Younce et al. | 379/406.01 |
| 7,450,713 B2 * | 11/2008 | Laberteaux | 379/406.01 |
| 7,607,052 B2 * | 10/2009 | Creigh | 714/701 |
| 7,769,102 B2 * | 8/2010 | Chan | 375/295 |
| 7,773,741 B1 * | 8/2010 | LeBlanc et al. | 379/406.01 |
| 7,801,241 B2 * | 9/2010 | Agazzi et al. | 375/285 |
| 2002/0101830 A1 * | 8/2002 | LeBlanc | 370/286 |
| 2007/0127711 A1 * | 6/2007 | LeBlanc | 379/406.16 |

* cited by examiner

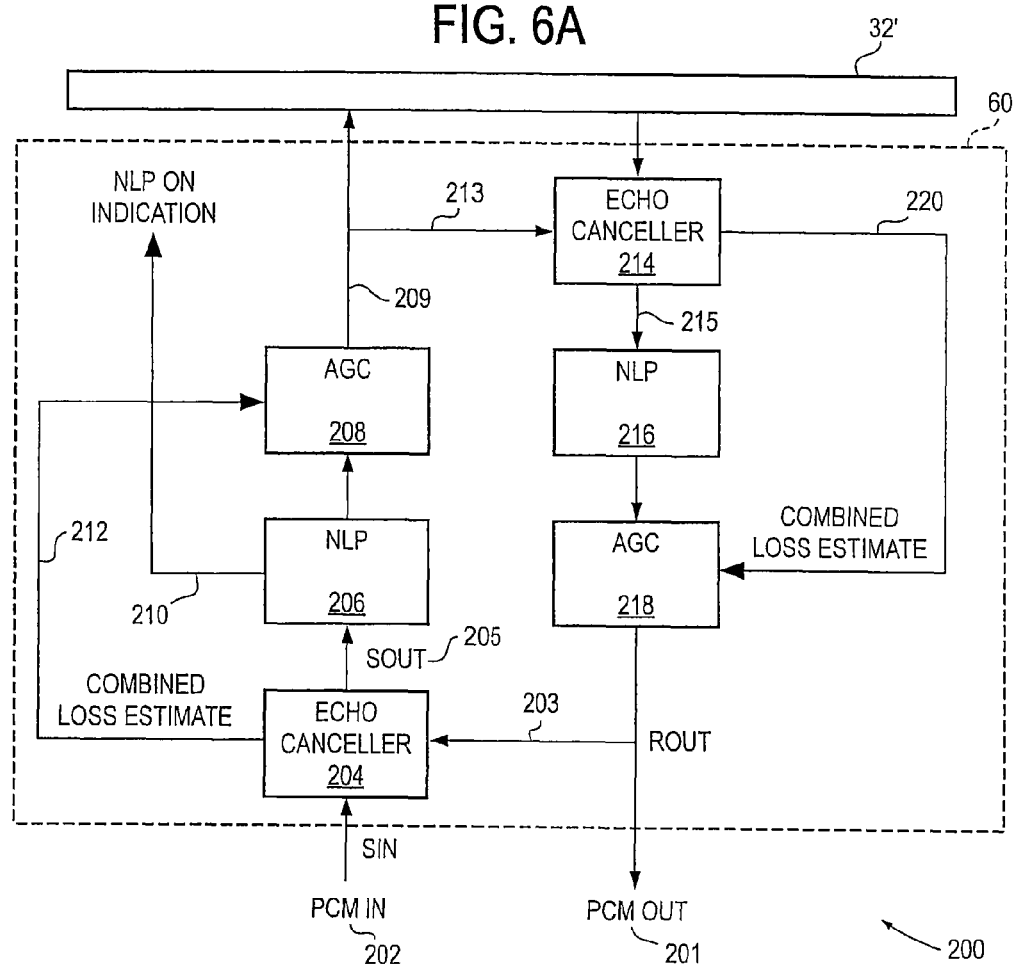
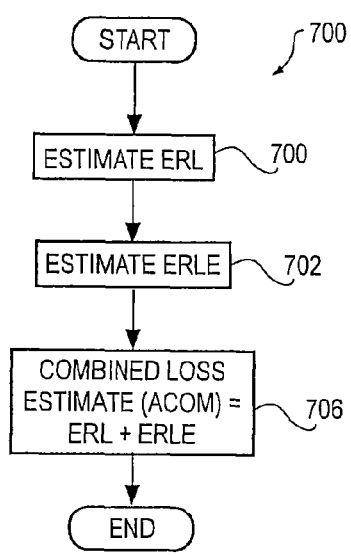

ADAPTIVE GAIN CONTROL BASED ON ECHO CANCELLER PERFORMANCE INFORMATION

CROSS-REFERENCE TO RELATED APPLICATIONS

The present application is a continuation of U.S. patent application Ser. No. 10/077,133, filed Feb. 15, 2002, which is a continuation-in-part of U.S. patent application Ser. No. 09/522,185, filed Mar. 9, 2000, which is a continuation-in-part of application Ser. No. 09/493,458, filed Jan. 28, 2000, which is a continuation-in-part of application Ser. No. 09/454,219, filed Dec. 9, 1999, priority of each application which is hereby claimed under 35 U.S.C. §120. All these applications are expressly incorporated herein by reference as though set forth in full.

FIELD OF THE INVENTION

The present invention relates generally to telecommunications systems, and more particularly, to a system and method for using information derived from an echo canceller to provide automatic gain control.

BACKGROUND OF THE INVENTION

Telephony devices, such as telephones, analog fax machines, and data modems, have traditionally utilized circuit-switched networks to communicate. With the current state of technology, it is desirable for telephony devices to communicate over the Internet, or other packet-based networks. Heretofore, an integrated system for interfacing various telephony devices over packet-based networks has been difficult due to the different modulation schemes of the telephony devices. Accordingly, it would be advantageous to have an efficient and robust integrated system for the exchange of voice, fax data and modem data between telephony devices and packet-based networks.

Such devices usually include some form of automatic gain control to compensate for losses when a signal progresses through the system. Telephony devices might typically include at least one echo canceling device to compensate for the echo return loss (ERL) that might occur in transmitting a signal from a near end to a far end, and vice versa. This echo canceling device can be used to provide a wealth of information regarding the processed signal. Accordingly, what is needed in the field is a gain control device that uses certain information provided by the echo canceling device in order to provide a more stable automatic gain control.

SUMMARY OF THE INVENTION

As signal losses are incurred in a particular system, gain control devices can be applied to boost the levels of the signal. Generally, it is better to have a stronger signal for use within the system. Hence it is desirable to apply as much gain as possible to a signal, but within the constraints of the system. If too much gain is applied, then instabilities in the system might result.

Automatic gain control (AGC) devices provide an automatic adjustment to the gain of a signal based upon such factors as the incoming signal level, and the like. However, when used with any type of system, an automatic gain control (AGC) device can become unstable if the signal conditions require an excessive gain to be provided. In particular, if the hybrid (or model) of the echo return loss of a system is poor, and the AGC is applying a considerable gain, then the overall loop gain can be greater than unity. A system under such constraints may prove to be unstable. Hence, in order to limit the loop gain, most AGCs have fixed limits on the amount of gain that can be applied (i.e., see ITU-T standard G.168 and G.169, each of which are hereby incorporated by reference).

Systems often include an embedded echo canceller device, or the like. This device might provide information about the signal, such as the echo return loss (ERL) and echo return loss enhancement (ERLE). Moreover, limits on the ERL and ERLE might also be known, as derived from the system, and also the echo canceller device. A combined loss estimate, i.e. ERL+ERLE can be derived from the echo canceller to show approximately how much signal loss is actually imposed by the system. If the combined loss estimate derived by the echo canceller is high, then the amount of gain to be applied by the AGC can be increased while guaranteeing overall stability of the system.

In prior systems, the AGC and echo canceller are independent components. Accordingly, the maximum AGC gain is based upon the average performance expected from the echo canceller, or a very low maximum gain is used to insure a stable system. The present system combines the information derived from these devices, wherein the AGC can thereby provide a relatively higher gain, yet still provide for a stable system.

Any variety of techniques might be used to determine the combined loss, and thereafter the maximum AGC gain. One technique herein involves determining the ERL and ERLE, and then combining them to find a combined loss (Acom). Each of the ERL and ERLE are computed from a representative set of power estimators. The gain is thereafter set equal to Acom adjusted down by a certain offset. If this adjusted gain is determined to be more than a set maximum gain, then the lesser of the two is used for the maximum AGC gain.

One aspect of the present invention is directed to a system for providing a gain to be generated by a gain control device located in at least one signal path of the system. The system includes an echo canceller and a gain control device in the signal path. There is at least one connection between the echo canceller device and the gain control device. Information pertaining to the signal is provided from the echo canceller device to the gain control device so that the gain can be maximized in light of the information.

According to another aspect of the present invention, a method is provided which provides a gain to be generated by a gain control device located in at least one signal path of the system. According to the method, a signal is received with an echo canceller device in the signal path and echo canceller performance information is generated. The performance information is sent to a gain control device in the signal path. The performance information is used to generate a gain that is maximized in light of the information.

According to another aspect of the present invention, a method is provided which generates an echo return loss (ERL) estimate for a communication signal. Pursuant to the method, an ERL value and an ERLc value are determined. The ERL estimate is then denoted as a function of the ERL value and the ERLc value.

According to yet another aspect of the present invention, a method is provided which generates an echo return loss enhancement (ERLE) estimate for a communication signal. According to the method, a first long term ERLE value ERLElt and a second long term ERLE value ERLE'lt are determined. The ERLE estimate is then denoted as a function of the ERLElt value and the ERLE'lt value.

Another aspect of the present invention is directed to a method of generating an echo return loss (ERL) estimate for a communication signal. Pursuant to the method, a first long term ERL value ERLlt and a second long term ERL value ERL'lt are determined. The ERL estimate is then denoted as a function of the ERLlt value and the ERL'lt value.

It is understood that other embodiments of the present invention will become readily apparent to those skilled in the art from the following detailed description, wherein embodiments of the invention are shown and described only by way of illustration of the best modes contemplated for carrying out the invention. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

DESCRIPTION OF THE DRAWINGS

These and other features, aspects, and advantages of the present invention will become better understood with regard to the following description, appended claims, and accompanying drawings where:

FIG. 6A is a block diagram, according to one aspect of the present invention, of a portion of FIG. 6 which further includes at least one automatic gain control which receives information from at least one echo canceller.

FIG. 7 is a representative flow chart, according to one aspect of the present invention, for determining a combined loss estimate.

DETAILED DESCRIPTION

An Embodiment of a Signal Processing System

In a preferred embodiment of the present invention, a signal processing system is employed to interface telephony devices with packet-based networks. Telephony devices include, by way of example, analog and digital phones, ethernet phones, Internet Protocol phones, fax machines, data modems, cable modems, interactive voice response systems, PBXs, key systems, and any other conventional telephony devices known in the art. The described preferred embodiment of the signal processing system can be implemented with a variety of technologies including, by way of example, embedded communications software that enables transmission of information, including voice, fax and modem data over packet-based networks. The embedded communications software is preferably run on programmable digital signal processors (DSPs) and is used in gateways, cable modems, remote access servers, PBXs, and other packet-based network appliances.

Figure 1:
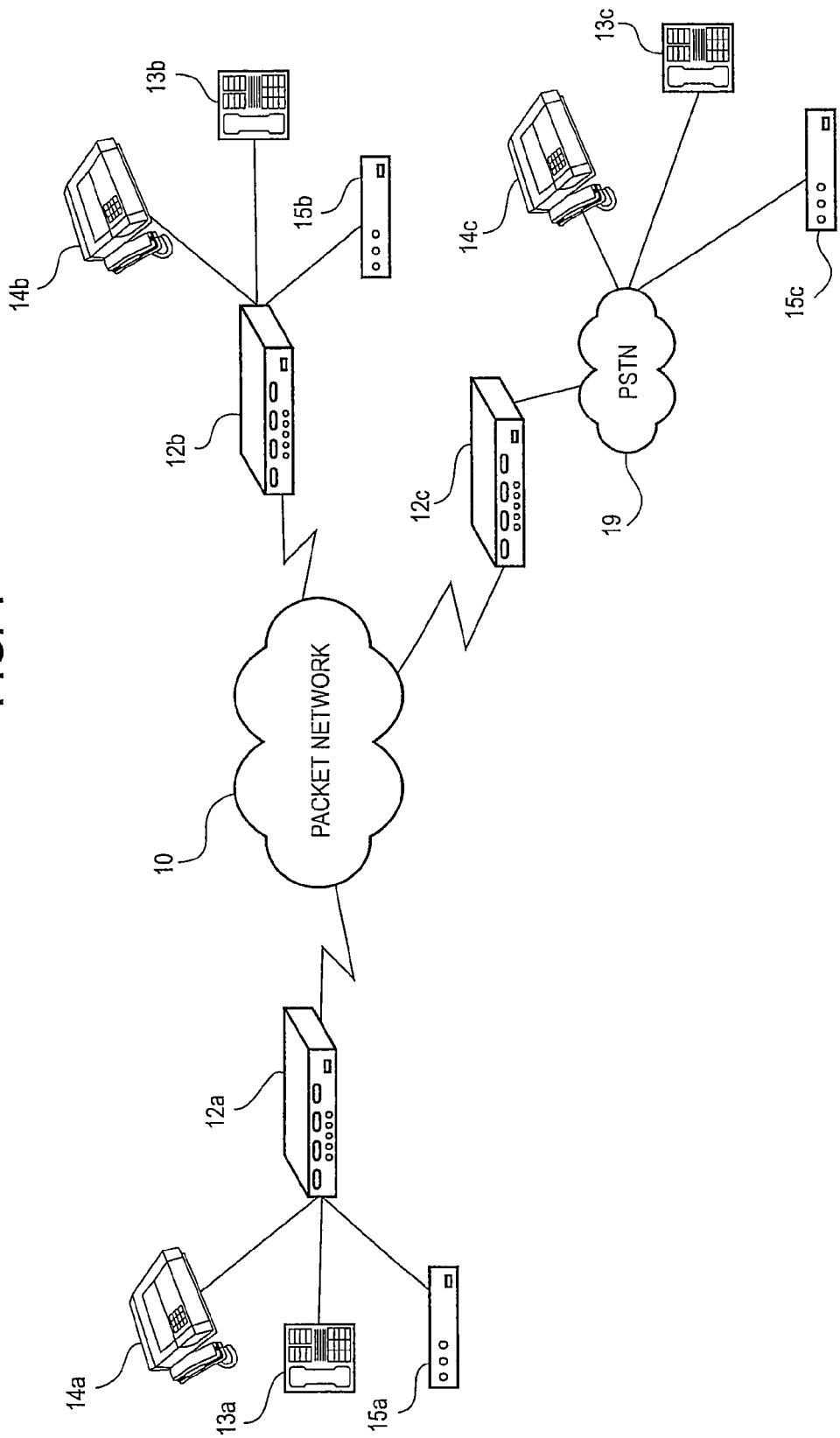
FIG. 1 is a block diagram of a packet-based infrastructure providing a communication medium with a number of telephony devices in accordance with a preferred embodiment of the present invention.

An exemplary topology is shown in FIG. 1 with a packet-based network 10 providing a communication medium between various telephony devices. Each network gateway 12a, 12b, 12c includes a signal processing system which provides an interface between the packet-based network 10 and a number of telephony devices. In the described exemplary embodiment, each network gateway 12a, 12b, 12c supports a fax machine 14a, 14b, 14c, a telephone 13a, 13b, 13c, and a modem 15a, 15b, 15c. As will be appreciated by those skilled in the art, each network gateway 12a, 12b, 12c could support a variety of different telephony arrangements. By way of example, each network gateway might support any number telephony devices and/or circuit-switched/packet-based networks including, among others, analog telephones, ethernet phones, fax machines, data modems, PSTN lines (Public Switching Telephone Network), ISDN lines (Integrated Services Digital Network), T1 systems, PBXs, key systems, or any other conventional telephony device and/or circuit-switched/packet-based network. In the described exemplary embodiment, two of the network gateways 12a, 12b provide a direct interface between their respective telephony devices and the packet-based network 10. The other network gateway 12c is connected to its respective telephony device through a PSTN 19. The network gateways 12a, 12b, 12c permit voice, fax and modem data to be carried over packet-based networks such as PCs running through a USB (Universal Serial Bus) or an asynchronous serial interface, Local Area Networks (LAN) such as Ethernet, Wide Area Networks (WAN) such as Internet Protocol (IP), Frame Relay (FR), Asynchronous Transfer Mode (ATM), Public Digital Cellular Network such as TDMA (IS-13x), CDMA (IS-9x) or GSM for terrestrial wireless applications, or any other packet-based system.

Figure 1A:
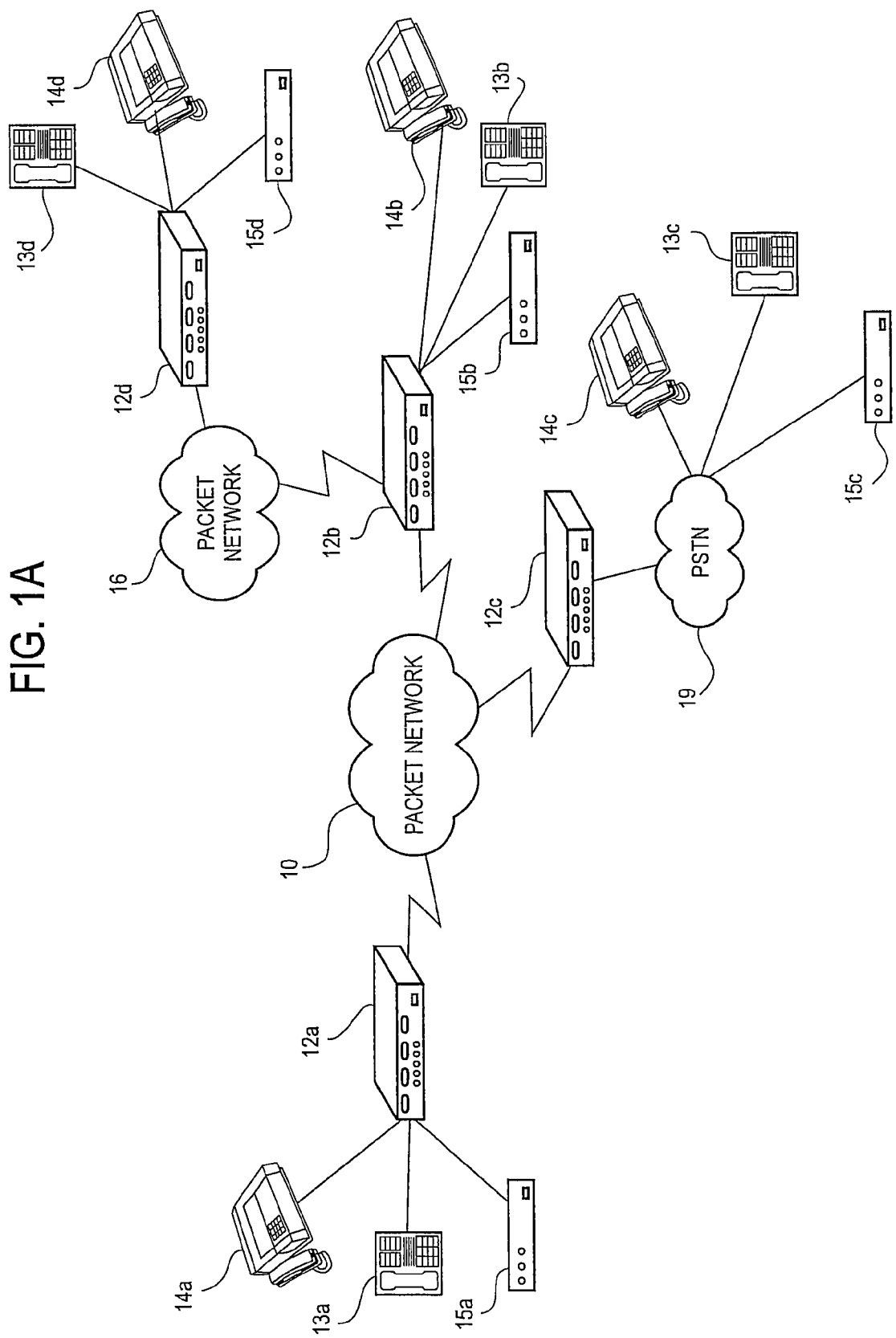
FIG. 1A is a block diagram of a packet-based infrastructure providing a communication medium with a number of telephony devices in accordance with a preferred embodiment of the present invention.

Another exemplary topology is shown in FIG. 1A. The topology of FIG. 1A is similar to that of FIG. 1 but includes a second packet-based network 16 that is connected to packet-based network 10 and to telephony devices 13b, 14b and 15b via network gateway 12b. The signal processing system of network gateway 12b provides an interface between packet-based network 10 and packet-based network 16 in addition to an interface between packet-based networks 10, 16 and telephony devices 13b, 14b and 15b. Network gateway 12d includes a signal processing system which provides an interface between packet-based network 16 and fax machine 14d, telephone 13d, and modem 15d.

Figure 2:
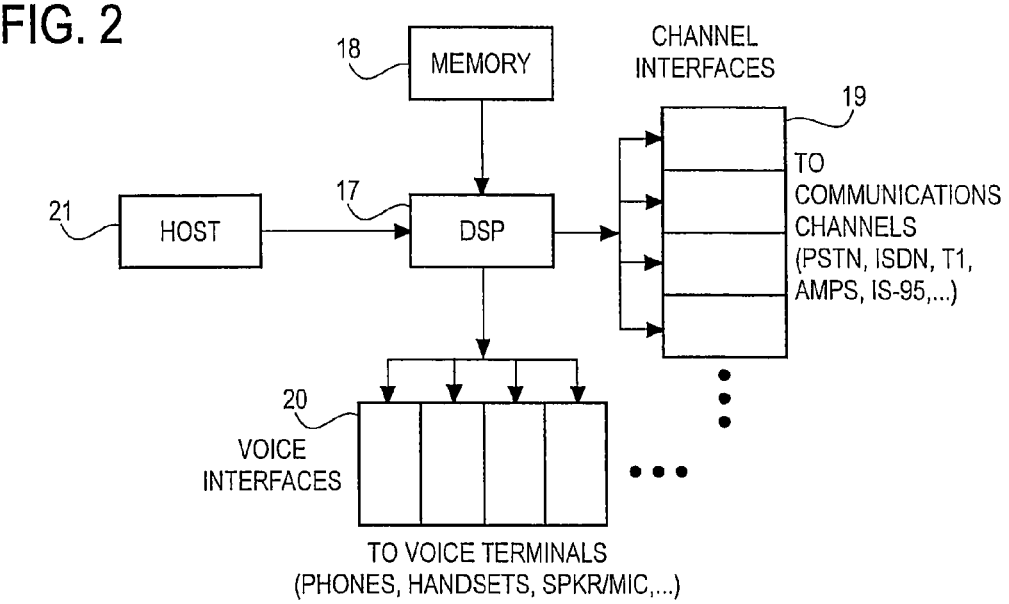
FIG. 2 is a block diagram of a signal processing system implemented with a programmable digital signal processor (DSP) software architecture in accordance with a preferred embodiment of the present invention.

The exemplary signal processing system can be implemented with a programmable DSP software architecture as shown in FIG. 2. This architecture has a DSP 17 with memory 18 at the core, a number of network channel interfaces 19 and telephony interfaces 20, and a host 21 that may reside in the DSP itself or on a separate microcontroller. The network channel interfaces 19 provide multi-channel access to the packet-based network. The telephony interfaces 23 can be connected to a circuit-switched network interface such as a PSTN system, or directly to any telephony device. The programmable DSP is effectively hidden within the embedded communications software layer. The software layer binds all core DSP algorithms together, interfaces the DSP hardware to the host, and provides low-level services such as the allocation of resources to allow higher level software programs to run.

Figure 3:
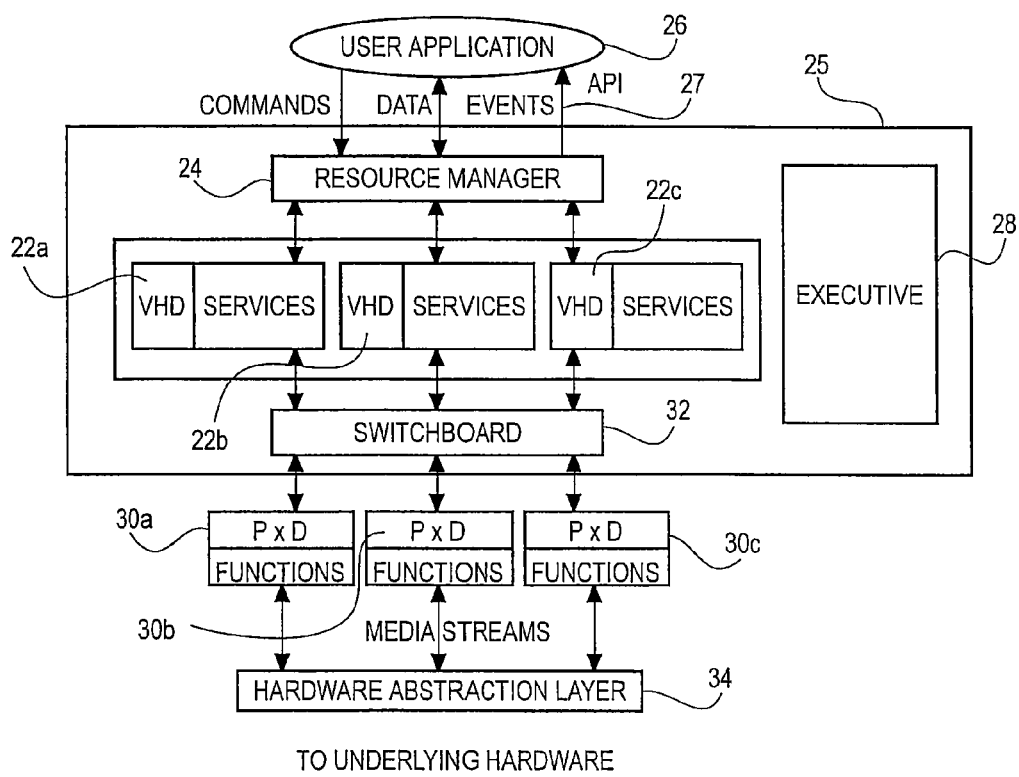
FIG. 3 is a block diagram of the software architecture operating on the DSP platform of FIG. 2 in accordance with a preferred embodiment of the present invention.

An exemplary multi-layer software architecture operating on a DSP platform is shown in FIG. 3. A user application layer 26 provides overall executive control and system management, and directly interfaces a DSP server 25 to the host 21 (see to FIG. 2). The DSP server 25 provides DSP resource management and telecommunications signal processing. Operating below the DSP server layer are a number of physical devices (PXD) 30a, 30b, 30c. Each PXD provides an interface between the DSP server 25 and an external telephony device (not shown) via a hardware abstraction layer (HAL) 34.

The DSP server 25 includes a resource manager 24 which receives commands from, forwards events to, and exchanges data with the user application layer 26. The user application layer 26 can either be resident on the DSP 17 or alternatively on the host 21 (see FIG. 2), such as a microcontroller. An application programming interface 27 (API) provides a software interface between the user application layer 26 and the resource manager 24. The resource manager 24 manages the internal/external program and data memory of the DSP 17. In addition the resource manager dynamically allocates DSP resources, performs command routing as well as other general purpose functions.

The DSP server 25 also includes virtual device drivers (VHDs) 22a, 22b, 22c. The VHDs are a collection of software objects that control the operation of and provide the facility for real time signal processing. Each VHD 22a, 22b, 22c includes an inbound and outbound media queue (not shown) and a library of signal processing services specific to that VHD 22a, 22b, 22c. In the described exemplary embodiment, each VHD 22a, 22b, 22c is a complete self-contained software module for processing a single channel with a number of different telephony devices. Multiple channel capability can be achieved by adding VHDs to the DSP server 25. The resource manager 24 dynamically controls the creation and deletion of VHDs and services.

A switchboard 32 in the DSP server 25 dynamically interconnects the PXDs 30a, 30b, 30c with the VHDs 22a, 22b, 22c. Each PXD 30a, 30b, 30c is a collection of software objects which provide signal conditioning for one external telephony device. For example, a PXD may provide volume and gain control for signals from a telephony device prior to communication with the switchboard 32. Multiple telephony functionalities can be supported on a single channel by connecting multiple PXDs, one for each telephony device, to a single VHD via the switchboard 32. Connections within the switchboard 32 are managed by the user application layer 26 via a set of API commands to the resource manager 24. The number of PXDs and VHDs is expandable, and limited only by the memory size and the MIPS (millions instructions per second) of the underlying hardware.

A hardware abstraction layer (HAL) 34 interfaces directly with the underlying DSP 17 hardware (see FIG. 2) and exchanges telephony signals between the external telephony devices and the PXDs. The HAL 34 includes basic hardware interface routines, including DSP initialization, target hardware control, codec sampling, and hardware control interface routines. The DSP initialization routine is invoked by the user application layer 26 to initiate the initialization of the signal processing system. The DSP initialization sets up the internal registers of the signal processing system for memory organization, interrupt handling, timer initialization, and DSP configuration. Target hardware initialization involves the initialization of all hardware devices and circuits external to the signal processing system. The HAL 34 is a physical firmware layer that isolates the communications software from the underlying hardware. This methodology allows the communications software to be ported to various hardware platforms by porting only the affected portions of the HAL 34 to the target hardware.

The exemplary software architecture described above can be integrated into numerous telecommunications products. In an exemplary embodiment, the software architecture is designed to support telephony signals between telephony devices (and/or circuit-switched networks) and packet-based networks. A network VHD (NetVHD) is used to provide a single channel of operation and provide the signal processing services for transparently managing voice, fax, and modem data across a variety of packet-based networks. More particularly, the NetVHD encodes and packetizes DTMF, voice, fax, and modem data received from various telephony devices and/or circuit-switched networks and transmits the packets to the user application layer. In addition, the NetVHD disassembles DTMF, voice, fax, and modem data from the user application layer, decodes the packets into signals, and transmits the signals to the circuit-switched network or device.

Figure 4:
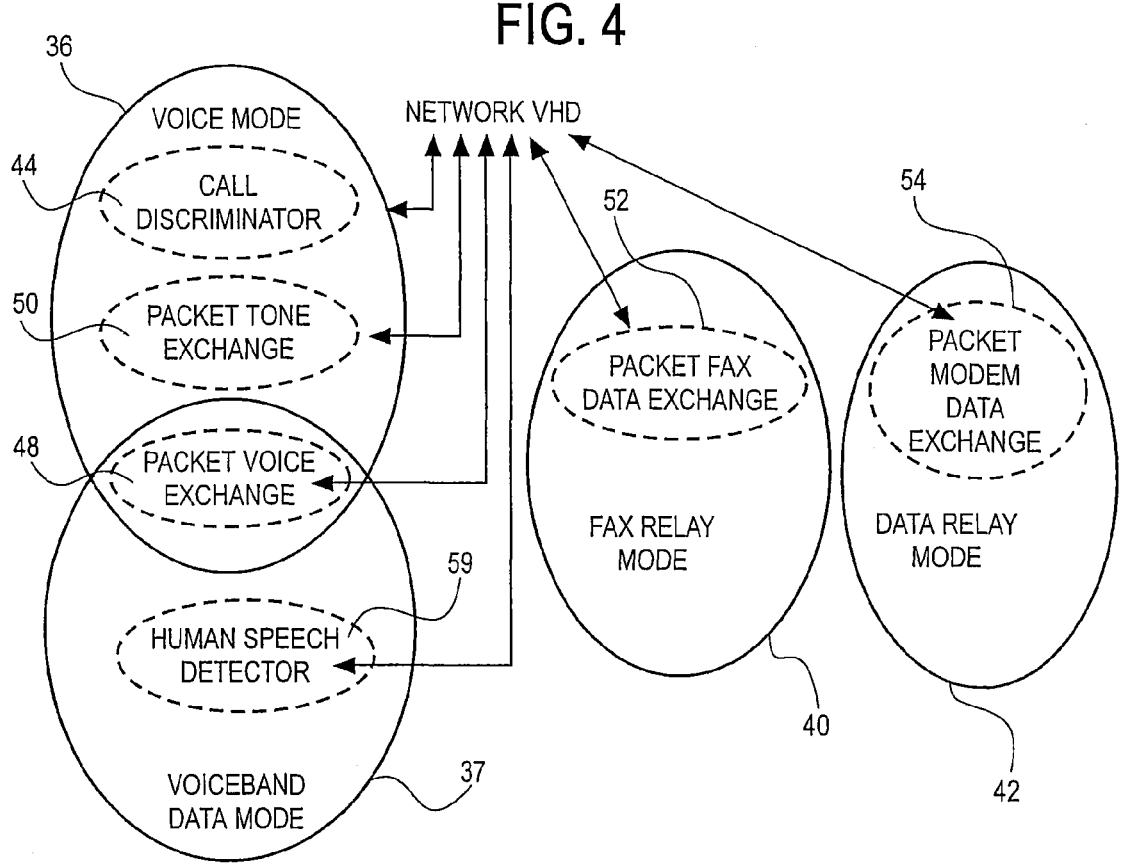
FIG. 4 is a state machine diagram of the operational modes of a virtual device driver for packet-based network applications in accordance with a preferred embodiment of the present invention.

An exemplary embodiment of the NetVHD operating in the described software architecture is shown in FIG. 4. The NetVHD includes four operational modes, namely voice mode 36, voiceband data mode 37, fax relay mode 40, and data relay mode 42. In each operational mode, the resource manager invokes various services. For example, in the voice mode 36, the resource manager invokes call discrimination 44, packet voice exchange 48, and packet tone exchange 50. The packet voice exchange 48 may employ numerous voice compression algorithms, including, among others, Linear 128 kbps, G.711 u-law/A-law 64 kbps (ITU Recommendation G.711 (1988)—Pulse code modulation (PCM) of voice frequencies), G.726 16/24/32/40 kbps (ITU Recommendation G.726 (12/90)-40, 32, 24, 16 kbit/s Adaptive Differential Pulse Code Modulation (ADPCM)), G.729A 8 kbps (Annex A (11/96) to ITU Recommendation G.729—Coding of speech at 8 kbit/s using conjugate structure algebraic-code-excited linear-prediction (CS-ACELP) B Annex A: Reduced complexity 8 kbit/s CS-ACELP speech codec), and G.723 5.3/6.3 kbps (ITU Recommendation G.723.1 (03/96)—Dual rate coder for multimedia communications transmitting at 5.3 and 6.3 kbit/s). The contents of each of the foregoing ITU Recommendations being incorporated herein by reference as if set forth in full. The packet voice exchange 48 is common to both the voice mode 36 and the voiceband data mode 37. In the voiceband data mode 37, the resource manager invokes the packet voice exchange 48 for exchanging transparently data without modification (other than packetization) between the telephony device (or circuit-switched network) and the packet-based network. This is typically used for the exchange of fax and modem data when bandwidth concerns are minimal as an alternative to demodulation and remodulation. During the voiceband data mode 37, the human speech detector service 59 is also invoked by the resource manager. The human speech detector 59 monitors the signal from the near end telephony device for speech. In the event that speech is detected by the human speech detector 59, an event is forwarded to the resource manager which, in turn, causes the resource manager to terminate the human speech detector service 59 and invoke the appropriate services for the voice mode 36 (i.e., the call discriminator, the packet tone exchange, and the packet voice exchange).

In the fax relay mode 40, the resource manager invokes a fax exchange 52 service. The packet fax exchange 52 may employ various data pumps including, among others, V.17 which can operate up to 14,400 bits per second, V.29 which uses a 1700-Hz carrier that is varied in both phase and amplitude, resulting in 16 combinations of 8 phases and 4 amplitudes which can operate up to 9600 bits per second, and V.27ter which can operate up to 4800 bits per second. Likewise, the resource manager invokes a packet data exchange 54 service in the data relay mode 42. The packet data exchange 52 may employ various data pumps including, among others, V.22bis/V.22 with data rates up to 2400 bits per second, V.32bis/V.32 which enables full-duplex transmission at 14,400 bits per second, and V.34 which operates up to 33,600 bits per second. The ITU Recommendations setting forth the standards for the foregoing data pumps are incorporated herein by reference as if set forth in full.

In the described exemplary embodiment, the user application layer does not need to manage any service directly. The user application layer manages the session using high-level commands directed to the NetVHD, which in turn directly runs the services. However, the user application layer can access more detailed parameters of any service if necessary to change, by way of example, default functions for any particular application.

In operation, the user application layer opens the NetVHD and connects it to the appropriate PXD. The user application then may configure various operational parameters of the NetVHD, including, among others, default voice compression (Linear, G.711, G.726, G.723.1, G.723.1A, G.729A, G.729B), fax data pump (Binary, V.17, V.29, V.27ter), and modem data pump (Binary, V.22bis, V.32bis, V.34). The user application layer then loads an appropriate signaling service (not shown) into the NetVHD, configures it and sets the NetVHD to the On-hook state.

In response to events from the signaling service (not shown) via a near end telephony device (hookswitch), or signal packets from the far end, the user application will set the NetVHD to the appropriate off-hook state, typically voice mode. In an exemplary embodiment, if the signaling service event is triggered by the near end telephony device, the packet tone exchange will generate dial tone. Once a DTMF tone is detected, the dial tone is terminated. The DTMF tones are packetized and forwarded to the user application layer for transmission on the packet-based network. The packet tone exchange could also play ringing tone back to the near end telephony device (when a far end telephony device is being rung), and a busy tone if the far end telephony device is unavailable. Other tones may also be supported to indicate all circuits are busy, or an invalid sequence of DTMF digits were entered on the near end telephony device.

Once a connection is made between the near end and far end telephony devices, the call discriminator is responsible for differentiating between a voice and machine call by detecting the presence of a 2100 Hz. tone (as in the case when the telephony device is a fax or a modem), a 1100 Hz. tone or V.21 modulated high level data link control (HDLC) flags (as in the case when the telephony device is a fax). If a 1100 Hz. tone, or V.21 modulated HDLC flags are detected, a calling fax machine is recognized. The NetVHD then terminates the voice mode 36 and invokes the packet fax exchange to process the call. If however, 2100 Hz tone is detected, the NetVHD terminates voice mode and invokes the packet data exchange.

The packet data exchange service further differentiates between a fax and modem by continuing to monitor the incoming signal for V.21 modulated HDLC flags, which if present, indicate that a fax connection is in progress. If HDLC flags are detected, the NetVHD terminates packet data exchange service and initiates packet fax exchange service. Otherwise, the packet data exchange service remains operative. In the absence of an 1100 or 2100 Hz. tone, or V.21 modulated HDLC flags the voice mode remains operative.

The Voice Mode

Figure 5:
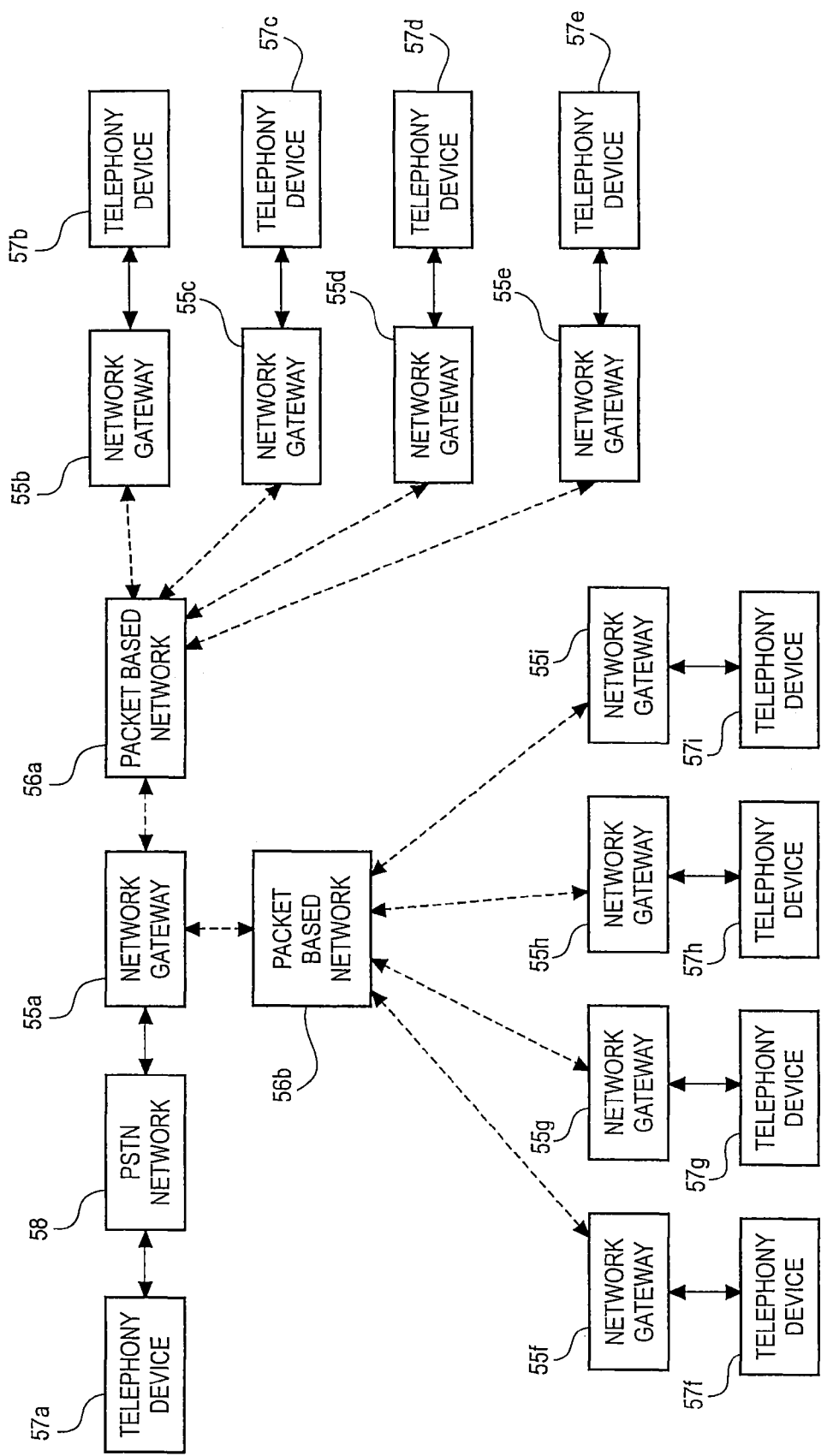
FIG. 5 is a block diagram of several signal processing systems in the voice mode for interfacing between a switched circuit network and a packet-based network in accordance with a preferred embodiment of the present invention.

Voice mode provides signal processing of voice signals. As shown in the exemplary embodiment depicted in FIG. 5, voice mode enables the transmission of voice over a packet-based system such as Voice over IP (VoIP, H.323), Voice over Frame Relay (VoFR, FRF-11), Voice Telephony over ATM (VTOA), or any other proprietary network. The voice mode should also permit voice to be carried over traditional media such as time division multiplex (TDM) networks and voice storage and playback systems. Network gateway 55a supports the exchange of voice between a traditional circuit-switched network 58 and packet-based networks 56(a) and 56(b). Network gateways 55b, 55c, 55d, 55e support the exchange of voice between packet-based network 56a and a number of telephony devices 57b, 57c, 57d, 57e. In addition, network gateways 55f, 55g, 55h, 55i support the exchange of voice between packet-based network 56b and telephony devices 57f, 57g, 57h, 57i. Telephony devices 57a, 57b, 57c, 57d, 57e, 55f, 55g, 55h, 55i can be any type of telephony device including telephones, facsimile machines and modems.

The PXDs for the voice mode provide echo cancellation, gain, and automatic gain control. The network VHD invokes numerous services in the voice mode including call discrimination, packet voice exchange, and packet tone exchange. These network VHD services operate together to provide: (1) an encoder system with DTMF detection, call progress tone detection, voice activity detection, voice compression, and comfort noise estimation, and (2) a decoder system with delay compensation, voice decoding, DTMF generation, comfort noise generation and lost frame recovery.

Figure 6:
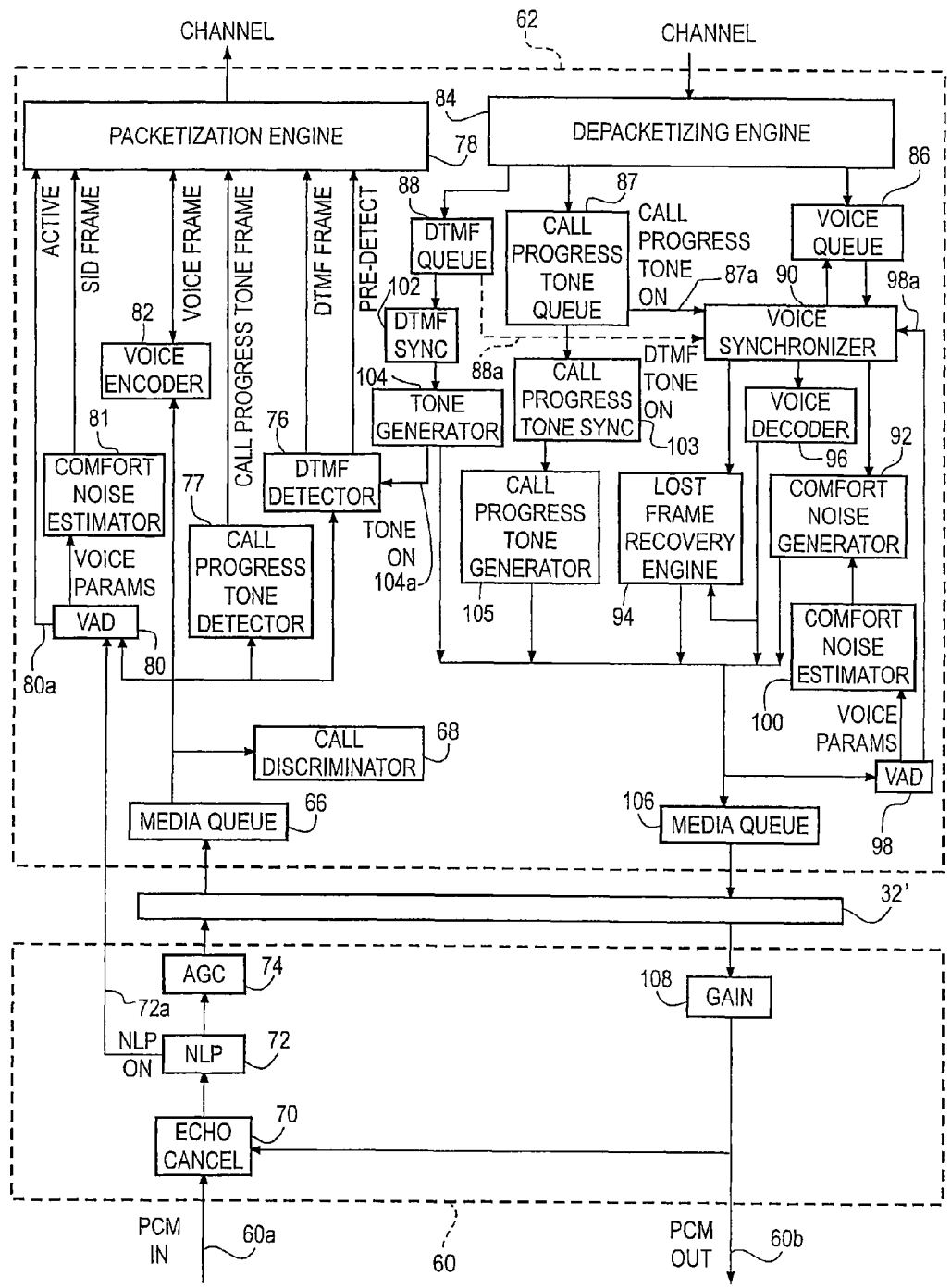
FIG. 6 is a system block diagram of a signal processing system operating in a voice mode in accordance with a preferred embodiment of the present invention.

The services invoked by the network VHD in the voice mode and the associated PXD is shown schematically in FIG. 6. In the described exemplary embodiment, the PXD 60 provides two way communication with a telephone or a circuit-switched network, such as a PSTN line (e.g. DS0) carrying a 64 kb/s pulse code modulated (PCM) signal, i.e., digital voice samples.

The incoming PCM signal 60a is initially processed by the PXD 60 to remove far end echoes that might otherwise be transmitted back to the far end user. As the name implies, echoes in telephone systems is the return of the talker's voice resulting from the operation of the hybrid with its two-four wire conversion. If there is low end-to-end delay, echo from the far end is equivalent to side-tone (echo from the near-end), and therefore, not a problem. Side-tone gives users feedback as to how loud they are talking, and indeed, without side-tone, users tend to talk too loud. However, far end echo delays of more than about 10 to 30 msec significantly degrade the voice quality and are a major annoyance to the user.

An echo canceller 70 is used to remove echoes from far end speech present on the incoming PCM signal 60a before routing the incoming PCM signal 60a back to the far end user. The echo canceller 70 samples an outgoing PCM signal 60b from the far end user, filters it, and combines it with the incoming PCM signal 60a. Preferably, the echo canceller 70 is followed by a non-linear processor (NLP) 72 which may mute the digital voice samples when far end speech is detected in the absence of near end speech. The echo canceller 70 may also inject comfort noise which in the absence of near end speech may be roughly at the same level as the true background noise or at a fixed level.

After echo cancellation, the power level of the digital voice samples is normalized by an automatic gain control (AGC) 74 to ensure that the conversation is of an acceptable loudness. Alternatively, the AGC can be performed before the echo canceller 70. However, this approach would entail a more complex design because the gain would also have to be applied to the sampled outgoing PCM signal 60b. In the described exemplary embodiment, the AGC 74 is designed to adapt slowly, although it should adapt fairly quickly if overflow or clipping is detected. The AGC adaptation should be held fixed if the NLP 72 is activated.

After AGC, the digital voice samples are placed in the media queue 66 in the network VHD 62 via the switchboard 32'. In the voice mode, the network VHD 62 invokes three services, namely call discrimination, packet voice exchange, and packet tone exchange. The call discriminator 68 analyzes the digital voice samples from the media queue to determine whether a 2100 Hz tone, a 1100 Hz tone or V.21 modulated HDLC flags are present. As described above with reference to FIG. 4, if either tone or HDLC flags are detected, the voice mode services are terminated and the appropriate service for fax or modem operation is initiated. In the absence of a 2100 Hz tone, a 1100 Hz tone, or HDLC flags, the digital voice samples are coupled to the encoder system which includes a voice encoder 82, a voice activity detector (VAD) 80, a comfort noise estimator 81, a DTMF detector 76, a call progress tone detector 77 and a packetization engine 78.

Typical telephone conversations have as much as sixty percent silence or inactive content. Therefore, high bandwidth gains can be realized if digital voice samples are suppressed during these periods. A VAD 80, operating under the packet voice exchange, is used to accomplish this function. The VAD 80 attempts to detect digital voice samples that do not contain active speech. During periods of inactive speech, the comfort noise estimator 81 couples silence identifier (SID) packets to a packetization engine 78. The SID packets contain voice parameters that allow the reconstruction of the background noise at the far end.

From a system point of view, the VAD 80 may be sensitive to the change in the NLP 72. For example, when the NLP 72 is activated, the VAD 80 may immediately declare that voice is inactive. In that instance, the VAD 80 may have problems tracking the true background noise level. If the echo canceller 70 generates comfort noise during periods of inactive speech, it may have a different spectral characteristic from the true background noise. The VAD 80 may detect a change in noise character when the NLP 72 is activated (or deactivated) and declare the comfort noise as active speech. For these reasons, the VAD 80 should be disabled when the NLP 72 is activated. This is accomplished by a "NLP on" message 72a passed from the NLP 72 to the VAD 80.

The voice encoder 82, operating under the packet voice exchange, can be a straight 16 bit PCM encoder or any voice encoder which supports one or more of the standards promulgated by ITU. The encoded digital voice samples are formatted into a voice packet (or packets) by the packetization engine 78. These voice packets are formatted according to an applications protocol and outputted to the host (not shown). The voice encoder 82 is invoked only when digital voice samples with speech are detected by the VAD 80. Since the packetization interval may be a multiple of an encoding interval, both the VAD 80 and the packetization engine 78 should cooperate to decide whether or not the voice encoder 82 is invoked. For example, if the packetization interval is 10 msec and the encoder interval is 5 msec (a frame of digital voice samples is 5 ms), then a frame containing active speech should cause the subsequent frame to be placed in the 10 ms packet regardless of the VAD state during that subsequent frame. This interaction can be accomplished by the VAD 80 passing an "active" flag 80a to the packetization engine 78, and the packetization engine 78 controlling whether or not the voice encoder 82 is invoked.

In the described exemplary embodiment, the VAD 80 is applied after the AGC 74. This approach provides optimal flexibility because both the VAD 80 and the voice encoder 82 are integrated into some speech compression schemes such as those promulgated in ITU Recommendations G.729 with Annex B VAD (March 1996)—Coding of Speech at 8 kbits/s Using Conjugate-Structure Algebraic-Code-Exited Linear Prediction (CS-ACELP), and G.723.1 with Annex A VAD (March 1996)—Dual Rate Coder for Multimedia Communications Transmitting at 5.3 and 6.3 kbit/s, the contents of which is hereby incorporated by reference as through set forth in full herein.

Operating under the packet tone exchange, a DTMF detector 76 determines whether or not there is a DTMF signal present at the near end. The DTMF detector 76 also provides a pre-detection flag 76a which indicates whether or not it is likely that the digital voice sample might be a portion of a DTMF signal. If so, the pre-detection flag 76a is relayed to the packetization engine 78 instructing it to begin holding voice packets. If the DTMF detector 76 ultimately detects a DTMF signal, the voice packets are discarded, and the DTMF signal is coupled to the packetization engine 78. Otherwise the voice packets are ultimately released from the packetization engine 78 to the host (not shown). The benefit of this method is that there is only a temporary impact on voice packet delay when a DTMF signal is pre-detected in error, and not a constant buffering delay. Whether voice packets are held while the pre-detection flag 76a is active could be adaptively controlled by the user application layer.

Similarly, a call progress tone detector 77 also operates under the packet tone exchange to determine whether a precise signaling tone is present at the near end. Call progress tones are those which indicate what is happening to dialed phone calls. Conditions like busy line, ringing called party, bad number, and others each have distinctive tone frequencies and cadences assigned them. The call progress tone detector 77 monitors the call progress state, and forwards a call progress tone signal to the packetization engine to be packetized and transmitted across the packet based network. The call progress tone detector may also provide information regarding the near end hook status which is relevant to the signal processing tasks. If the hook status is on hook, the VAD should preferably mark all frames as inactive, DTMF detection should be disabled, and SID packets should only be transferred if they are required to keep the connection alive.

The decoding system of the network VHD 62 essentially performs the inverse operation of the encoding system. The decoding system of the network VHD 62 comprises a depacketizing engine 84, a voice queue 86, a DTMF queue 88, a precision tone queue 87, a voice synchronizer 90, a DTMF synchronizer 102, a precision tone synchronizer 103, a voice decoder 96, a VAD 98, a comfort noise estimator 100, a comfort noise generator 92, a lost packet recovery engine 94, a tone generator 104, and a precision tone generator 105.

The depacketizing engine 84 identifies the type of packets received from the host (i.e., voice packet, DTMF packet, call progress tone packet, SID packet), transforms them into frames which are protocol independent. The depacketizing engine 84 then transfers the voice frames (or voice parameters in the case of SID packets) into the voice queue 86, transfers the DTMF frames into the DTMF queue 88 and transfers the call progress tones into the call progress tone queue 87. In this manner, the remaining tasks are, by and large, protocol independent.

A jitter buffer is utilized to compensate for network impairments such as delay jitter caused by packets not arriving at the same time or in the same order in which they were transmitted. In addition, the jitter buffer compensates for lost packets that occur on occasion when the network is heavily congested. In the described exemplary embodiment, the jitter buffer for voice includes a voice synchronizer 90 that operates in conjunction with a voice queue 86 to provide an isochronous stream of voice frames to the voice decoder 96.

Sequence numbers embedded into the voice packets at the far end can be used to detect lost packets, packets arriving out of order, and short silence periods. The voice synchronizer 90 can analyze the sequence numbers, enabling the comfort noise generator 92 during short silence periods and performing voice frame repeats via the lost packet recovery engine 94 when voice packets are lost. SID packets can also be used as an indicator of silent periods causing the voice synchronizer 90 to enable the comfort noise generator 92. Otherwise, during far end active speech, the voice synchronizer 90 couples voice frames from the voice queue 86 in an isochronous stream to the voice decoder 96. The voice decoder 96 decodes the voice frames into digital voice samples suitable for transmission on a circuit switched network, such as a 64 kb/s PCM signal for a PSTN line. The output of the voice decoder 96 (or the comfort noise generator 92 or lost packet recovery engine 94 if enabled) is written into a media queue 106 for transmission to the PXD 60.

The comfort noise generator 92 provides background noise to the near end user during silent periods. If the protocol supports SID packets, (and these are supported for VTOA, FRF-11, and VoIP), the comfort noise estimator at the far end encoding system should transmit SID packets. Then, the background noise can be reconstructed by the near end comfort noise generator 92 from the voice parameters in the SID packets buffered in the voice queue 86. However, for some protocols, namely, FRF-11, the SID packets are optional, and other far end users may not support SID packets at all. In these systems, the voice synchronizer 90 must continue to operate properly. In the absence of SID packets, the voice parameters of the background noise at the far end can be determined by running the VAD 98 at the voice decoder 96 in series with a comfort noise estimator 100.

Preferably, the voice synchronizer 90 is not dependent upon sequence numbers embedded in the voice packet. The voice synchronizer 90 can invoke a number of mechanisms to compensate for delay jitter in these systems. For example, the voice synchronizer 90 can assume that the voice queue 86 is in an underflow condition due to excess jitter and perform packet repeats by enabling the lost frame recovery engine 94. Alternatively, the VAD 98 at the voice decoder 96 can be used to estimate whether or not the underflow of the voice queue 86 was due to the onset of a silence period or due to packet loss. In this instance, the spectrum and/or the energy of the digital voice samples can be estimated and the result 98a fed back to the voice synchronizer 90. The voice synchronizer 90 can then invoke the lost packet recovery engine 94 during voice packet losses and the comfort noise generator 92 during silent periods.

When DTMF packets arrive, they are depacketized by the depacketizing engine 84. DTMF frames at the output of the depacketizing engine 84 are written into the DTMF queue 88. The DTMF synchronizer 102 couples the DTMF frames from the DTMF queue 88 to the tone generator 104. Much like the voice synchronizer, the DTMF synchronizer 102 is employed to provide an isochronous stream of DTMF frames to the tone generator 104. Generally speaking, when DTMF packets are being transferred, voice frames should be suppressed. To some extent, this is protocol dependent. However, the capability to flush the voice queue 86 to ensure that the voice frames do not interfere with DTMF generation is desirable. Essentially, old voice frames which may be queued are discarded when DTMF packets arrive. This will ensure that there is a significant gap before DTMF tones are generated. This is achieved by a "tone present" message 88a passed between the DTMF queue and the voice synchronizer 90.

The tone generator 104 converts the DTMF signals into a DTMF tone suitable for a standard digital or analog telephone. The tone generator 104 overwrites the media queue 106 to prevent leakage through the voice path and to ensure that the DTMF tones are not too noisy.

There is also a possibility that DTMF tone may be fed back as an echo into the DTMF detector 76. To prevent false detection, the DTMF detector 76 can be disabled entirely (or disabled only for the digit being generated) during DTMF tone generation. This is achieved by a "tone on" message 104a passed between the tone generator 104 and the DTMF detector 76. Alternatively, the NLP 72 can be activated while generating DTMF tones.

When call progress tone packets arrive, they are depacketized by the depacketizing engine 84. Call progress tone frames at the output of the depacketizing engine 84 are written into the call progress tone queue 87. The call progress tone synchronizer 103 couples the call progress tone frames from the call progress tone queue 87 to a call progress tone generator 105. Much like the DTMF synchronizer, the call progress tone synchronizer 103 is employed to provide an isochronous stream of call progress tone frames to the call progress tone generator 105. And much like the DTMF tone generator, when call progress tone packets are being transferred, voice frames should be suppressed. To some extent, this is protocol dependent. However, the capability to flush the voice queue 86 to ensure that the voice frames do not interfere with call progress tone generation is desirable. Essentially, old voice frames which may be queued are discarded when call progress tone packets arrive to ensure that there is a significant inter-digit gap before call progress tones are generated. This is achieved by a "tone present" message 87*a* passed between the call progress tone queue 87 and the voice synchronizer 90.

The call progress tone generator 105 converts the call progress tone signals into a call progress tone suitable for a standard digital or analog telephone. The call progress tone generator 105 overwrites the media queue 106 to prevent leakage through the voice path and to ensure that the call progress tones are not too noisy.

The outgoing PCM signal in the media queue 106 is coupled to the PXD 60 via the switchboard 32'. The outgoing PCM signal is coupled to an amplifier 108 before being outputted on the PCM output line 60*b*.

The outgoing PCM signal in the media queue 106 is coupled to the PXD 60 via the switchboard 32'. The outgoing PCM signal is coupled to an amplifier 108 before being outputted on the PCM output line 60*b*.

Adaptive Gain Control Using Information from Echo Canceller

An echo canceller is used in many communications systems to estimate and eliminate the effect of losses across a transmission path. Systems will also generally use an automatic gain control (AGC) device in order to increase the gain and compensate for such losses across the transmission path. The present invention utilizes certain information (or statistics) pertaining to the signal that can be derived from the echo canceller. These statistics might be determined before or after the echo canceling operation. This information is then fed forward to an AGC in the signal path, and the maximum gain allowable can be increased accordingly. The present invention is meant to be generally applicable to any system which might use an echo canceller with AGC type devices. Additionally, other types of devices in the signal path, (i.e., other than an echo canceller), might also be used to supply information to the AGC in order to adjust the gain. The particular configuration and usage taught and suggested by the present invention would be useful for any system, as it provides a maximized signal gain, but maintains a stable system.

In terms of the present exemplary embodiment of a communications system, the elements of FIG. 6 can be further modified to include the elements of FIG. 6A. The elements of FIG. 6A (shown generally as 200) are meant to replace (in part, or in whole) those elements shown in block 60 of FIG. 6. For instance, switchboard 32' is shown interacting with block 60. An ingress signal, or PCM in 202, is also shown represented as Sin (i.e., signal in), and enters a first "near end" echo canceller 204. The near end echo canceller 204 also receives the resulting output (Rout) signal via the connection 203. The signal from the echo canceller 204 is shown as Sout (i.e., signal out). Sout next enters a non-linear processor (NLP) 206, which can supply an NLP "on" indication for use by other devices in the system. The ingress AGC 208 receives the signal resulting from the NLP 206. Additionally, the AGC is shown receiving a combined loss estimate 212 from the echo canceller 204.

The egress signal from the switchboard is shown first entering a "far end" echo canceller 214. The far end echo canceller 214 also receives the ingress signal after the AGC via the connection 213. Thereafter the signal enters an NLP 216. An egress AGC 218 thereafter receives the output from the NLP. The far end echo canceller 214 is shown to provide a combined loss estimate 220 to be used by the AGC in determining a maximum, yet stable, gain that might be applied to the egress signal. After the AGC 218, the Rout signal is also shown to be the PCM out signal 201.

Note that this figure shows an embodiment of an echo canceller and an AGC being used at both the ingress point and the egress point. Either set of devices may or may not present. For example, the system might only contain the near end echo canceller 204 and an ingress AGC 208. Conversely, the system might only contain the far end echo canceller 214 and an associated egress AGC 218.

One aspect of the present invention is to use the combined loss estimate, from either echo canceller, in the associated automatic gain control device. This allows the AGC to use a higher gain while still guaranteeing the overall stability of the system. This combined loss for a near end echo canceller is the loss in power from PCM out 201 to the signal 205 (Sout) after the echo canceller 204, in the absence of a near end signal. The combine loss estimate is also referred to herein as Acom, and is similarly referred to in the ITU-T standard G. 168. The echo level after the echo canceller 204 is the far end level (PCM out) minus the combined loss.

Conversely, for the far end echo canceller, the combined loss is the loss between the signal 209 which exists after the near end AGC 208, to the signal 215 which exists after the far end echo canceller 214.

This combined loss needs to be estimated by the echo canceller (either the ingress and/or egress echo canceller) in order to facilitate this invention. The combined loss estimate 212 (or 220) might be estimated in a variety of ways. One important aspect, however, is to obtain a relatively accurate estimate.

Accordingly, one representative embodiment of the Acom estimator is illustrated by the representative steps 700 as shown in FIG. 7. The combined loss estimate (Acom) is found by first estimating the echo return loss (ERL), as shown in step 702. Next the echo return loss enhancement (ERLE) is determined in step 704. Step 706 shows the combined loss estimate (Acom) being determined as the sum of the derived quantities ERL and ERLE.

The combined loss estimator is based upon a number of power estimators. For the present example, these include but are not limited to short term block powers, windowed powers, peak powers, and a near end detector. The ERL estimation and the ERLE estimation are then performed, with the combined loss being the combination of the two.

Figure 8A:
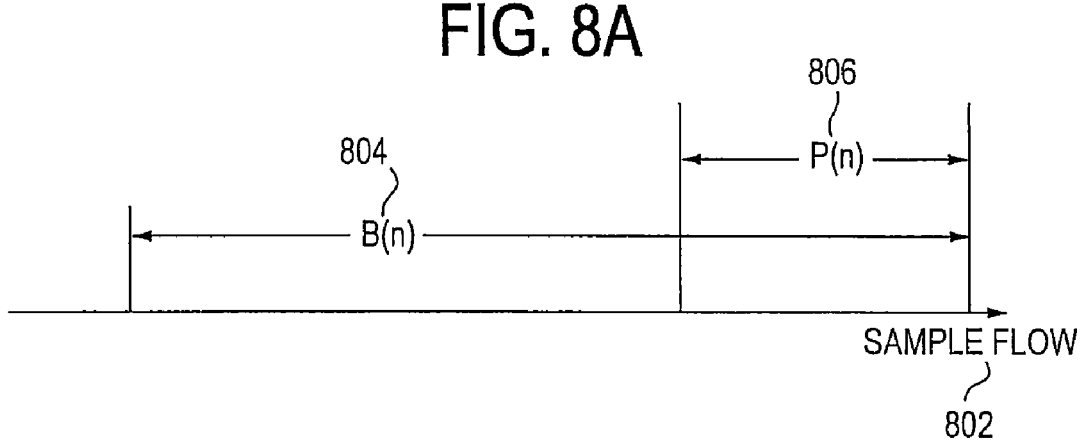
FIGS. 8A and 8B shows a representative sample flow of blocks, and certain quantities that might be computed in relation to this sample flow.

Referring now to FIG. 8A, a flow of samples is shown represented as a horizontal axis 802. A short term block power 804 is denoted as B(n). According to this example, the block power consists of the sum of the squares of the sample values over the most recent block of samples. In this representative example, the recent block includes 40 samples, or a 5 msec block at a sampling rate of 8 kHz.

Figure 8B:
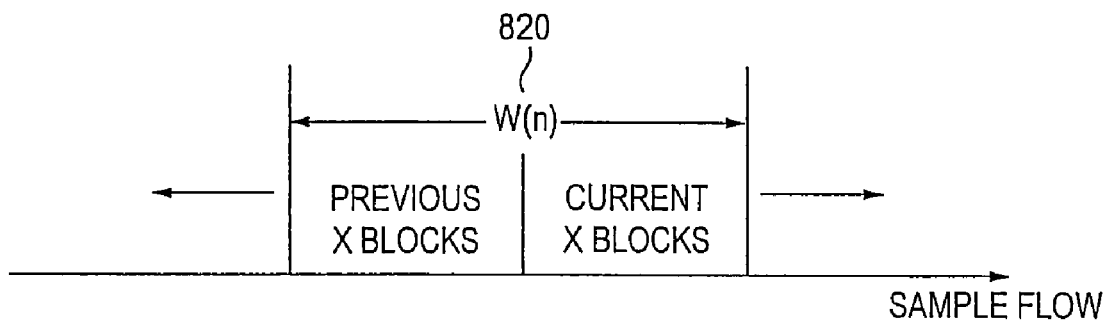

On a similar sample flow axis, FIG. 8B next demonstrates a windowed power W(n) 820. The windowed power is the sum of the block powers over a certain number X of current blocks and previous blocks. For the purposes of the present example, X will represent seven blocks (six previous blocks and the current block). Therefore, since each block is five msec long, the window power is the power over a 35 msec sliding rectangular window.

Referring again to FIG. 8A, the peak power P(n) 806 is the peak in B(n) 804 over the tail length of the echo canceller. For instance, for a 64 msec echo canceller, P(n) is then the largest block power over the last 65 msec of the sample flow, or over the last 13 blocks of B(n).

Figure 9:
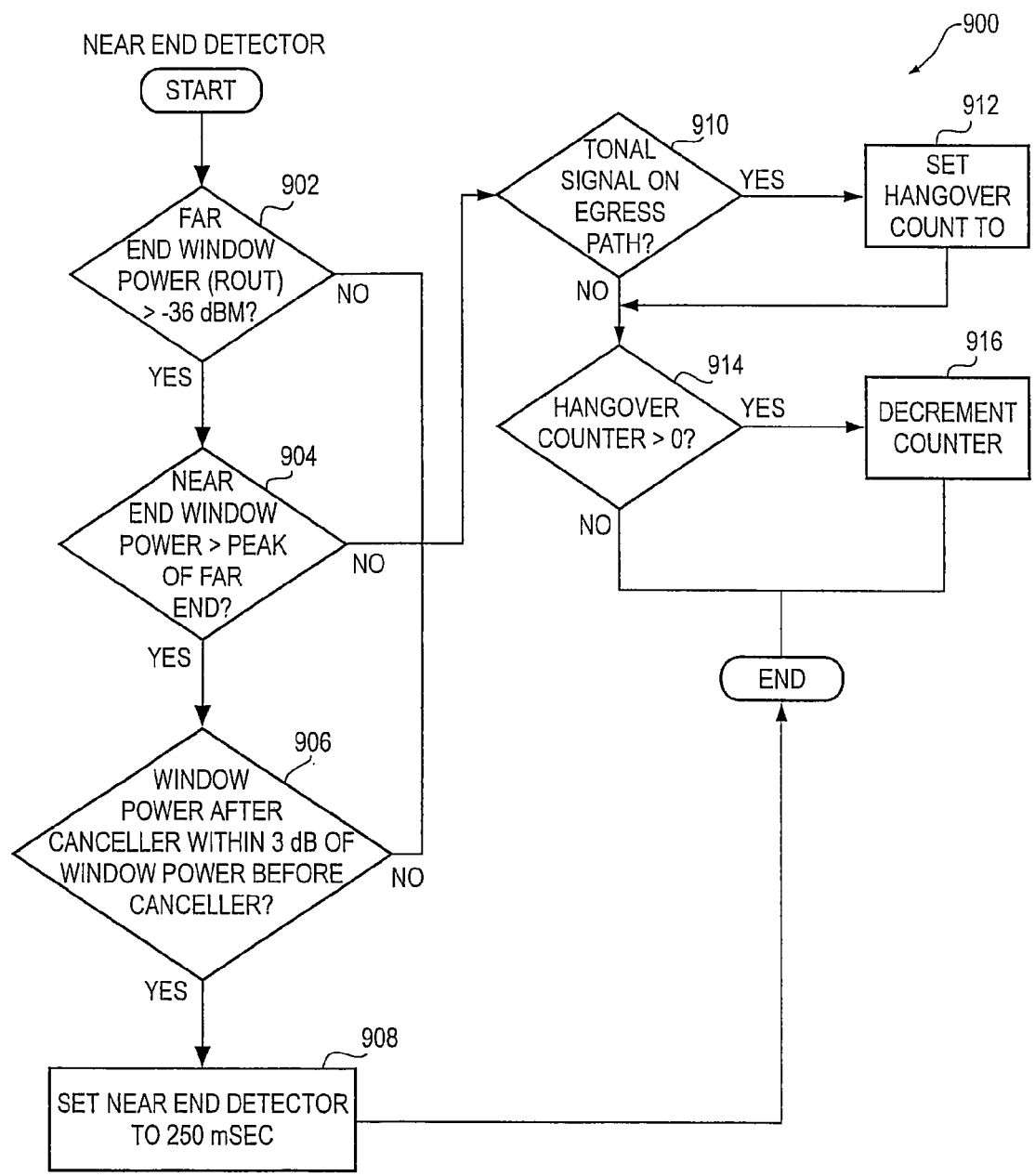
FIG. 9 is a representative flow chart, according to one aspect of the present invention, for determining a setting for a near end detector.

A near end detector is also used in the present example. FIG. 9 shows a set of representative steps 900 that might be used in setting the near end detector. As shown in step 902, the window power of the far end (Rout) is compared to −36 dBm. If the window power is greater, then a further inquiry is made in step 904 as to whether the near end window power after the canceller (i.e., Sout) is greater than the peak far end power. If Sout is greater than the peak far end power, then yet another inquiry is made in step 906 as to whether the window power after the echo canceller is within 3 dB of the window power before the canceller. In equation form, the inquiry becomes whether Wsout(n)>Wsout(n)−3 dB. If each of these conditions are satisfied, then step 908 shows the near end detector being set to a maximum value, i.e., 250 msec. If none of these conditions are collectively satisfied, then step 910 shows an inquiry as to whether there is a tonal signal on the egress (Rout) path. If yes, then step 912 shows the hangover count being set to a maximum value, i.e. 250 msec. The hangover count is generally an amount of time used in voice processing after a last speech frame. If no tonal signal is detected on the egress path, then an inquiry is made in step 914 as to whether the hangover counter is greater than zero. If yes, then step 916 shows the hangover counter being decremented. Note that while the values of −36 dBm, 3 dB, and 250 msec have been used to facilitate the working example above, the present invention is not intended to be limited to these particular values. In an alternative embodiment of the present invention, there are no steps 910 and 912. Thus, if any of the conditions in steps 902, 904 or 906 are not satisfied, then the inquiry is made in step 914 as to whether the hangover counter is greater than zero, regardless of whether there is a tonal signal on the egress path.

Figure 10:
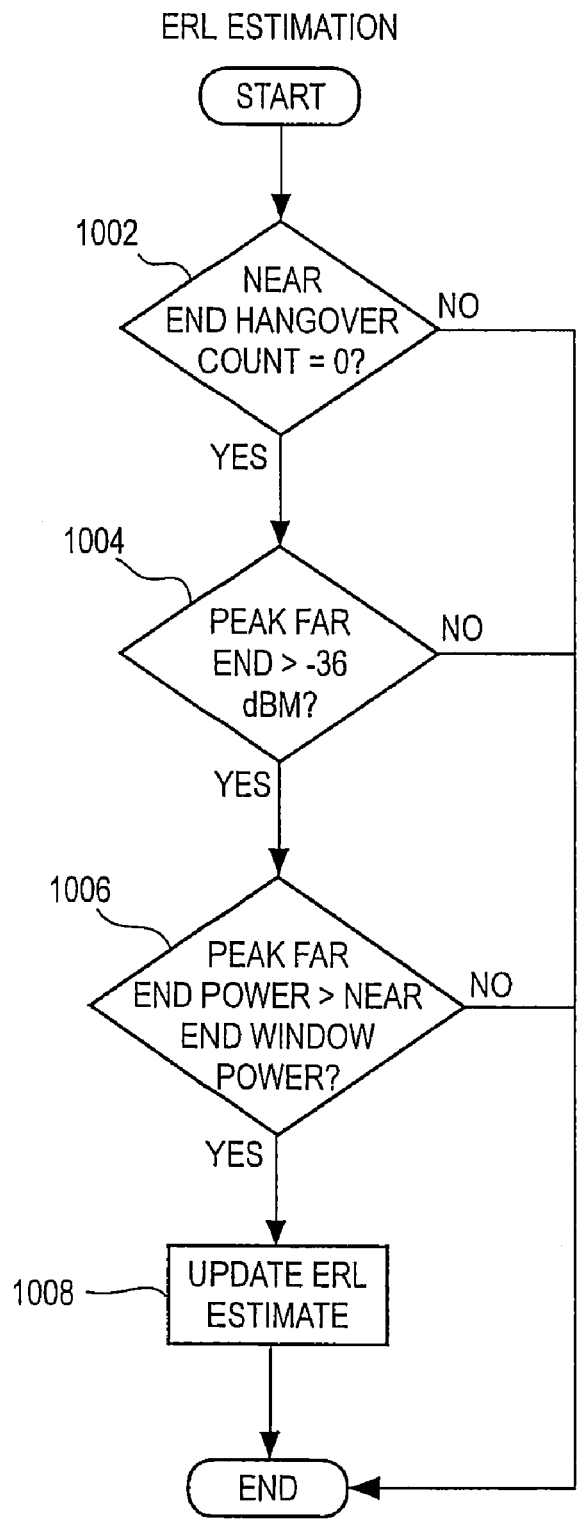
FIG. 10 is a representative flow chart, according to one aspect of the present invention, for determining an ERL estimation.

FIG. 10 next shows certain representative steps 1000 which might be used in determining the ERL estimation (represented as step 702 in FIG. 7). The ERL estimators are updated when a certain set of conditions are satisfied. Step 1002 first inquires if the near end hangover count is equal to zero. If yes, then step 1004 next inquires whether the peak far end power is greater than a set amount, i.e. −36 dBm. If yes, then step 1006 next inquires whether the peak far end power is greater than the near end window power (i.e., Wsin(n)). If these collective conditions have been satisfied, then step 1008 shows the process of updating the ERL estimate.

Figure 11:
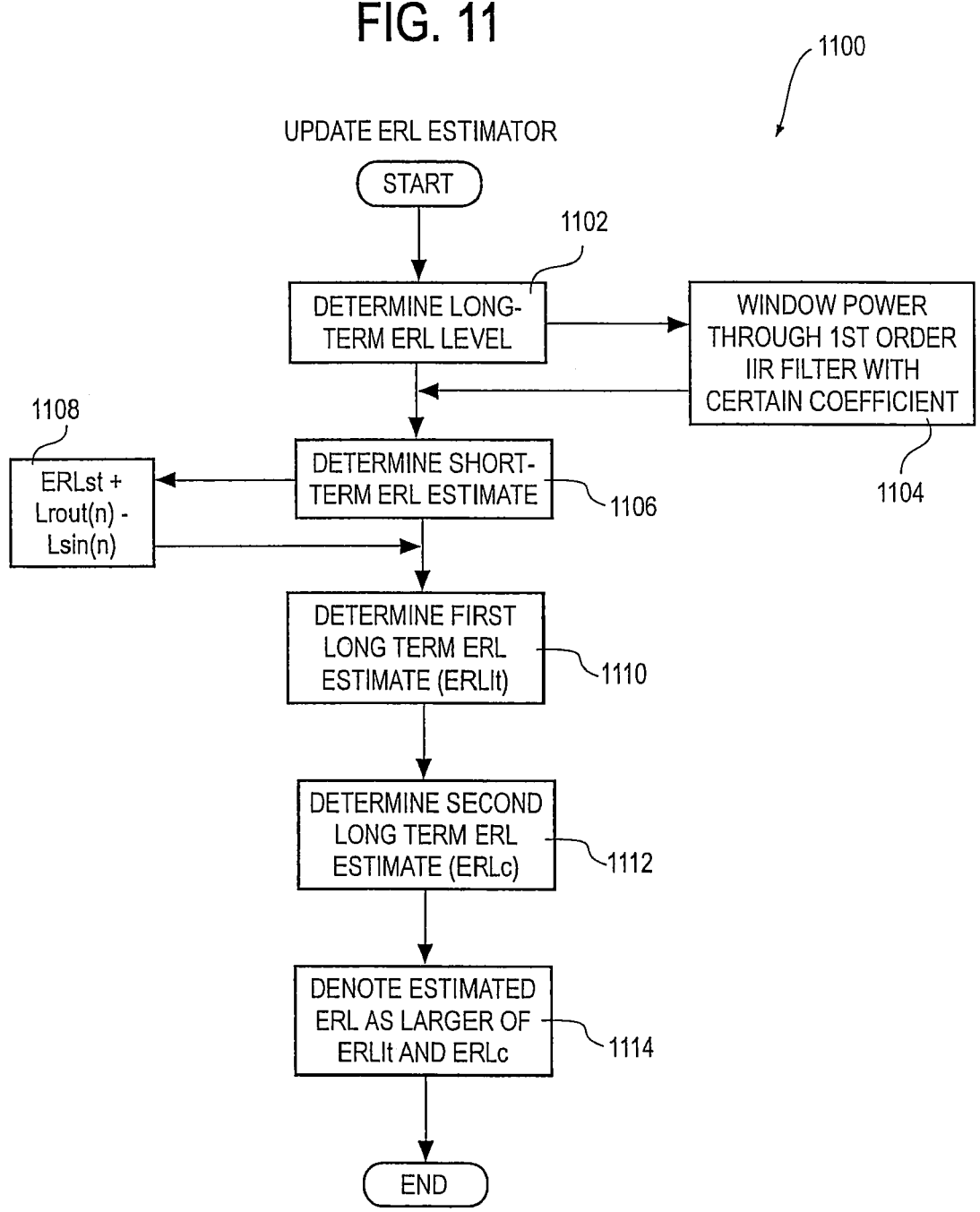
FIG. 11 is a representative flow chart, according to one aspect of the present invention, for updating the ERL estimator.

FIG. 11 next shows certain representative steps 1100 that might be used in association with updating the ERL estimator. Step 1102 first shows the process of determining a long-term ERL level. This is further detailed in step 1104 wherein the long term level is defined as the window power that has been filtered through a first order Infinite Impulse Response (IIR) filter using a set coefficient. For the present example, the coefficient used is approximately equal to 0.96875. This long term level is denoted by L(n).

Step 1106 next shows the process of computing a short term ERL estimate denoted as ERLst. Block 1108 further details this value, which is equal to the long term level at the egress point (i.e., Lrout(n)) minus the long term level as the signal-in point (i.e., Lsin(n)). In other words, the equation becomes ERLst=Lrout(n)−Lsin(n). Step 1110 next shows the process of determining a first longer term ERL estimate, which is denoted as ERLlt(n). Further details of representative steps 1100 are shown in FIG. 12.

In an illustrative embodiment of the present invention, the echo cancellers 204 and 214 each include a primary canceller and a secondary canceller. When the echo canceller 204, 214 adapts it adapts with a secondary (background) set of coefficients. When the echo canceller 204, 214 decides this secondary set of coefficients is better than the primary set, it copies the coefficients from the secondary canceller to the primary canceller. When the echo canceller 204, 214 updates the coefficients, it also updates its ERL and ERLE estimates. In other words, there are two copies of the ERL and ERLE estimates. The primary estimate (which is denoted herein as ERL'lt and ERLE'lt) is the estimate of the ERL (or ERLE) that was determined the last time the coefficients were updated. The secondary estimate (which is denoted herein as ERLlt and ERLElt) is the current one being updated as explained above with respect to, e.g., FIGS. 10 and 11.

Figure 12:
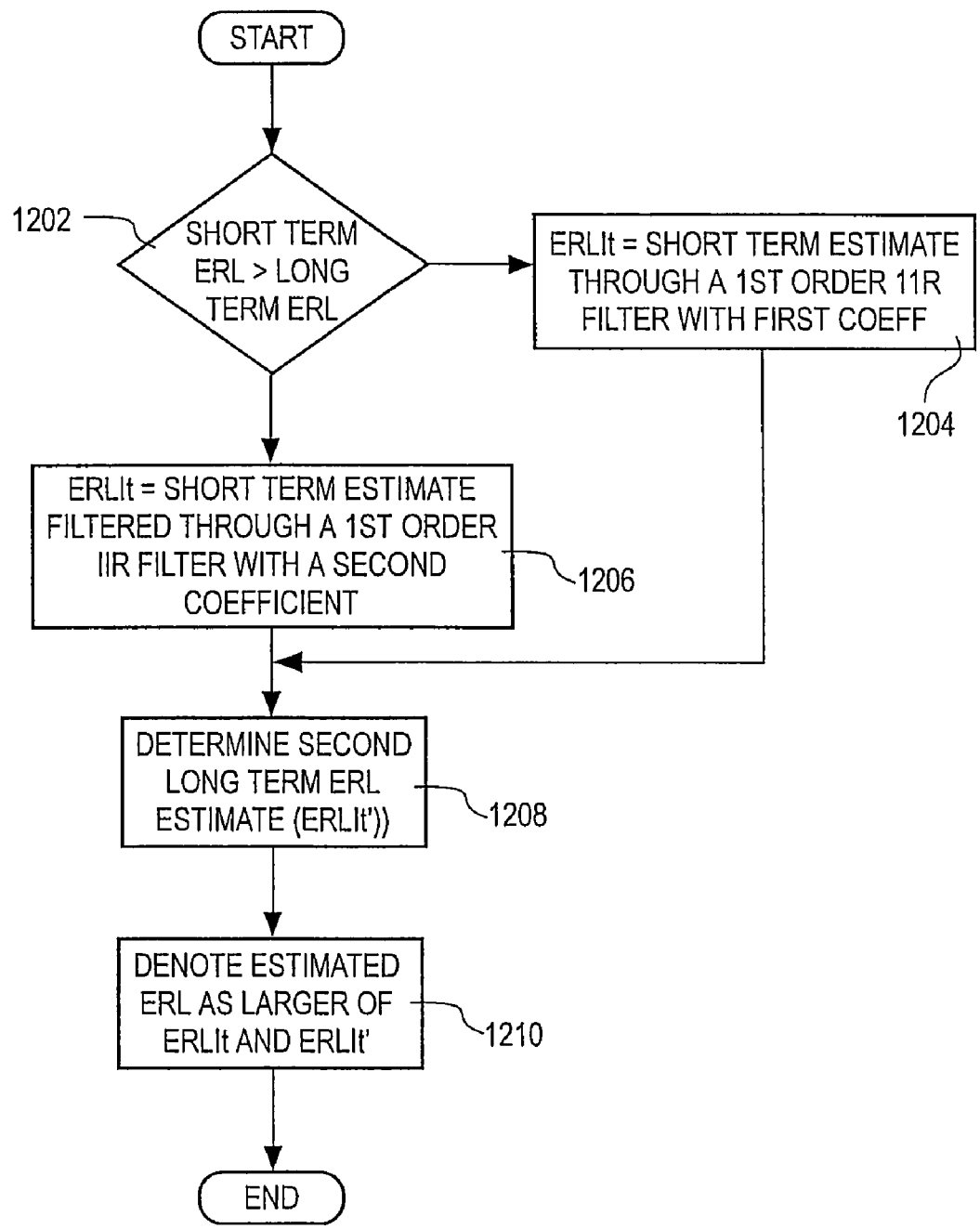
FIG. 12 is a representative flow chart, according to one aspect of the present invention, for determining a first long-term ERL estimate.

FIG. 12 shows further details of representative steps 1100 of FIG. 11. Block 1202 inquires whether the short term ERL is greater than the long term ERL. If the short term ERL is not greater than the long term ERL, then step 1204 shows ERLlt (n) being equal to the short term estimate filtered through a first order IIR filter having a first coefficient. For this example, this first coefficient is set to approximately 0.96875. If the short term ERL is greater than the long term ERL, then step 1206 shows ERLlt(n) being equal to the short term estimate filtered through a first order IIR filter having a second coefficient. Again for this example, the second coefficient is set to approximately 0.875. In step 1208, a second long term ERL, denoted as ERL'lt, is determined. ERL'lt is the ERL the last time the coefficients of the echo canceller were updated. At step 1210, the ERL estimate is denoted as the larger of the two values of ERLlt and ERL'lt.

Referring again to FIG. 11, step 1112 shows the process of determining a second long term ERL estimate, which is denoted as ERLc. This value is estimated by summing the squares of the echo canceller transversal filter coefficients. Thereafter step 1114 shows that the estimate of ERL is denoted as the larger of the two terms ERLlt and ERLc.

Figure 13:
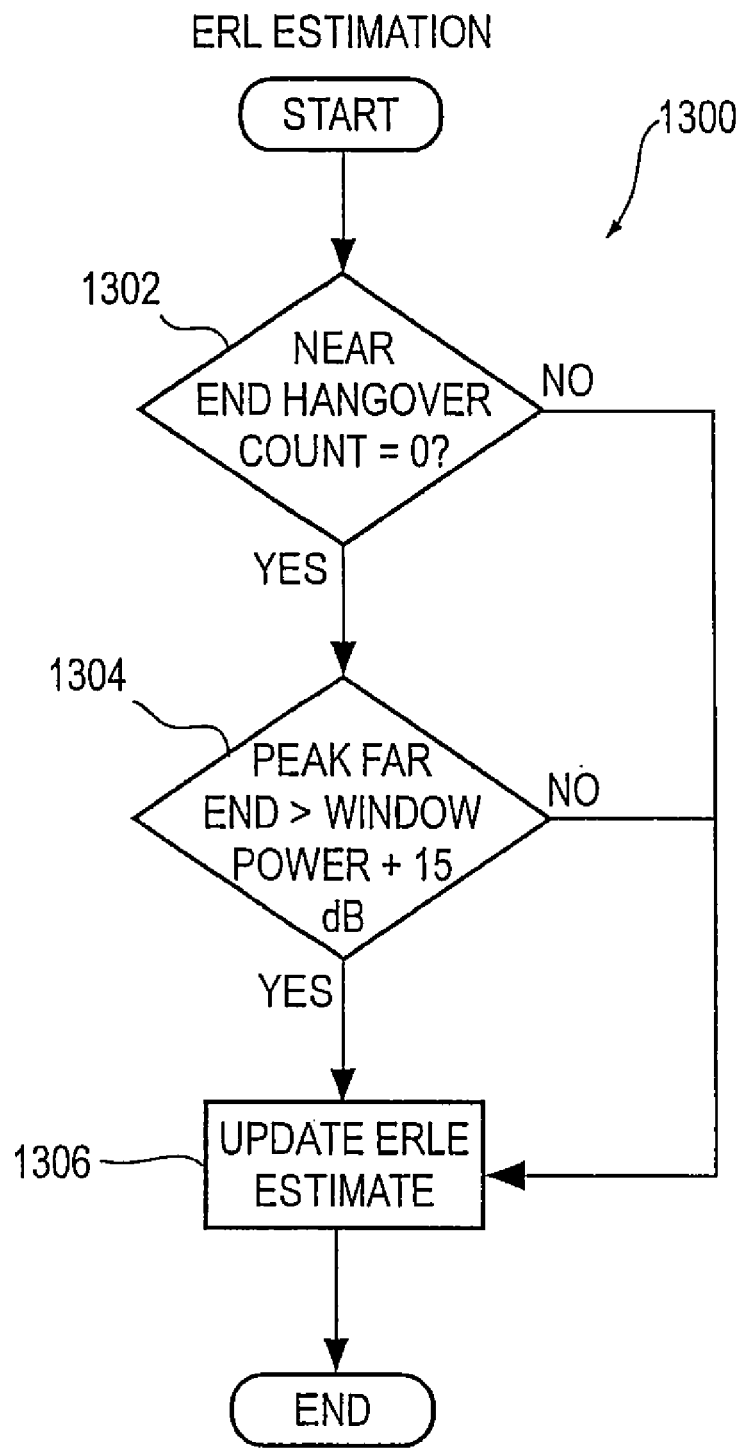
FIG. 13 is a representative flow chart, according to one aspect of the present invention, for determining an ERLE estimation.

FIG. 13 illustrates certain representative steps 1300 that might be associated with determining the ERLE estimation, as per step 704 of FIG. 7. The ERLE estimators are updated when certain conditions are satisfied. Namely, step 1302 inquires whether the near end hangover count is zero. If yes, then a subsequent inquiry is shown in step 1304, wherein it is determined if the peak far end is at least 15 dB greater than the window power after the echo canceller, i.e. the power at Sout. If both of these conditions are satisfied, then step 1306 shows the process of updating the ERLE estimate.

Figure 14:
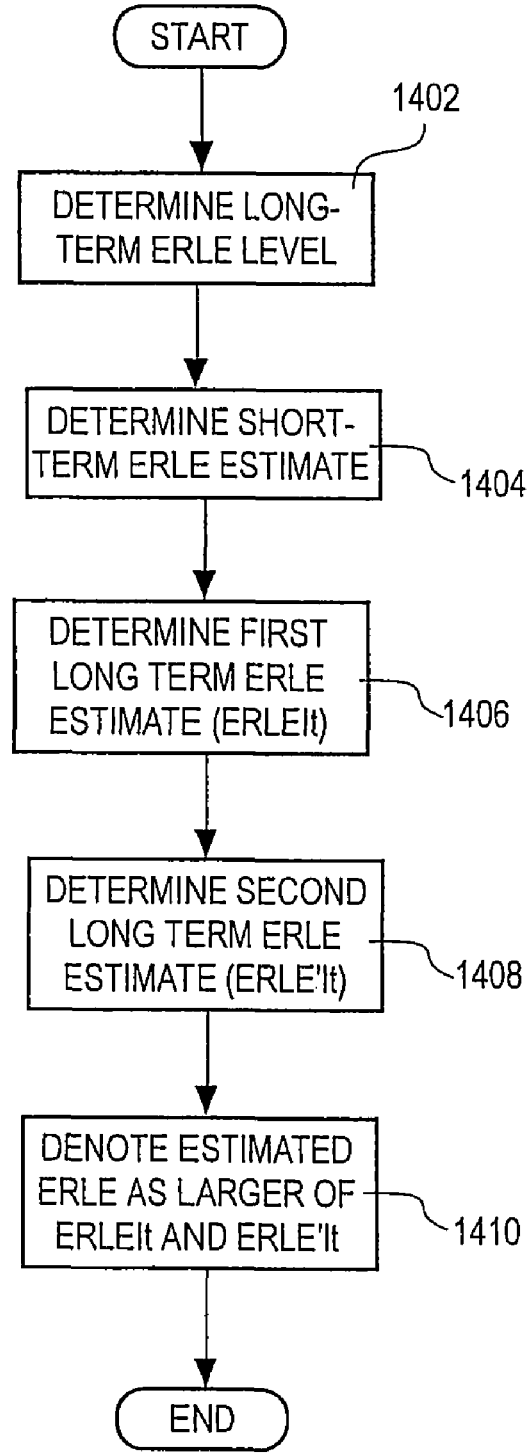
FIG. 14 is a representative flow chart, according to one aspect of the present invention, for updating the ERLE estimator.

FIG. 14 next shows certain representative steps 1400 that might be used in updating the ERLE estimate, as per step 1306 above. Step 1402 shows the process of determining the long-term ERLE level, which is denoted as L'(n). Step 1404 shows the process of determining the short-term ERLE estimate, which is denoted as ERLEst(n), by taking the long term ERLE level for the signal in (L'sin(n)) and subtracting the long term ERLE level at the signal out (L'sout(n)). The equation then becomes ERLEst=L'sin(n)−L'sout(n). Step 1406 shows the process of determining the first long term ERLE estimate, denoted ERLElt.

Figure 15:
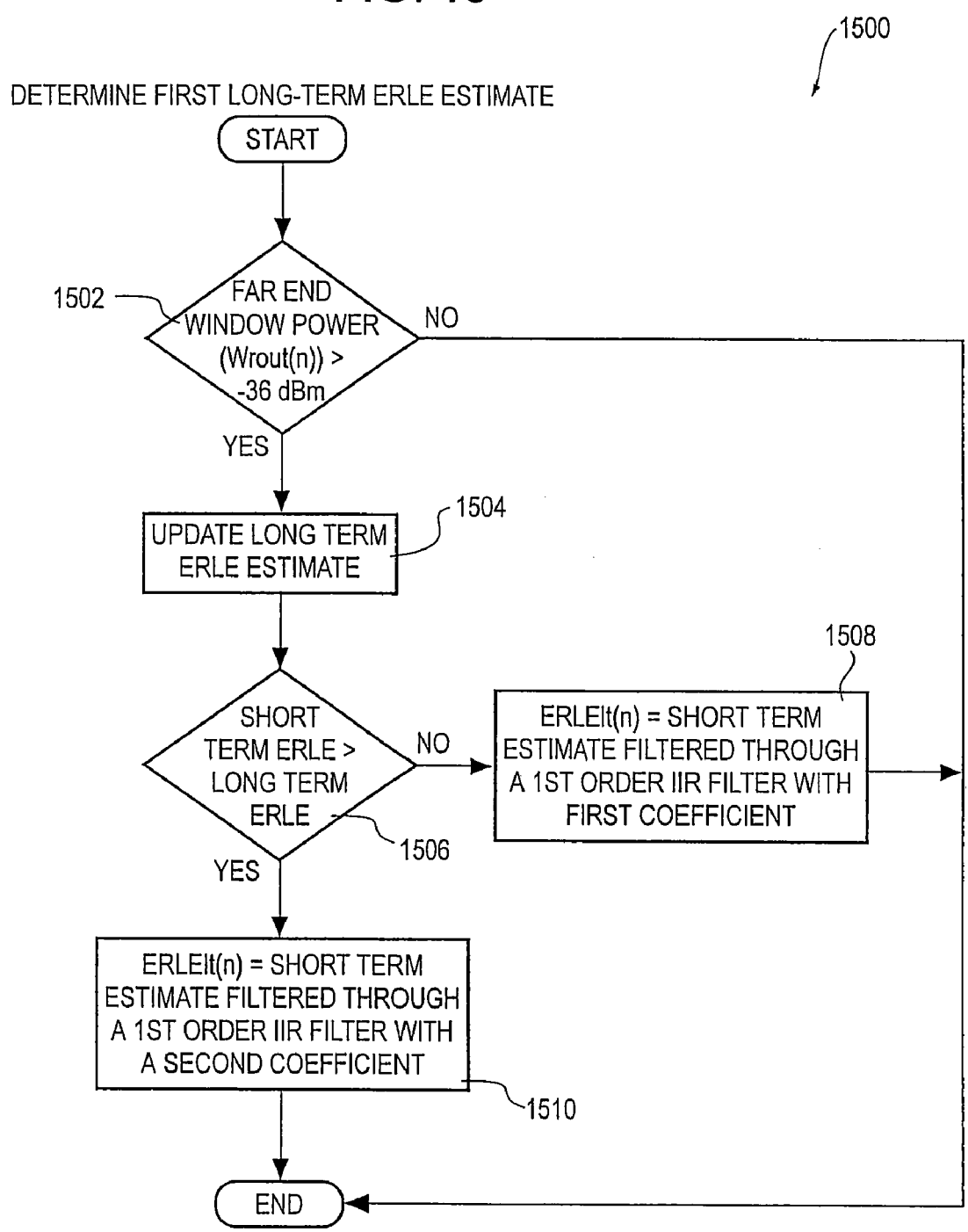
FIG. 15 is a representative flow chart, according to one aspect of the present invention, for determining a first long term ERLE estimate.

FIG. 15 next details certain representative steps 1500 associated with determining this first long term ERLE estimate. This long term estimate is updated upon the completion of certain conditions. Step 1502 shows an inquiry as to whether the far end window power (Wrout(n)) is greater than a certain level. In the present example, this level is set to approximately −36 dBm. If Wrout(n) is greater than −36 dBm, then block 1504 shows the process of updating the long term ERLE estimate. Step 1506 next inquires whether the short term ERLE is greater than the long term ERLE. If no, then step 1508 shows the value of ERLElt being determined as the short term estimate filtered through a first order IIR filter having a first coefficient. According to this present example, this first coefficient is set to approximately 0.96875. If the long term ERLE is greater than the short term ERLE, then step 1510 shows the value of ERLElt being determined as the short term estimate filtered through a first order IR filter having a second coefficient. As per the present example, this second coefficient is set to approximately 0.875.

Referring again to FIG. 14, the secondary long term ERLE, denoted as ERLE'lt, is defined as the ERLE the last time the coefficients of the echo cancellers were updated. Step 1410 shows that the estimate ERLE is denoted as the larger of the two values ERLElt and ERLE'lt. Referring again to FIG. 7, step 706 computes the combined loss estimate to be Acom=ERL+ERLE, each of which might be determined via the steps above.

Figure 16:
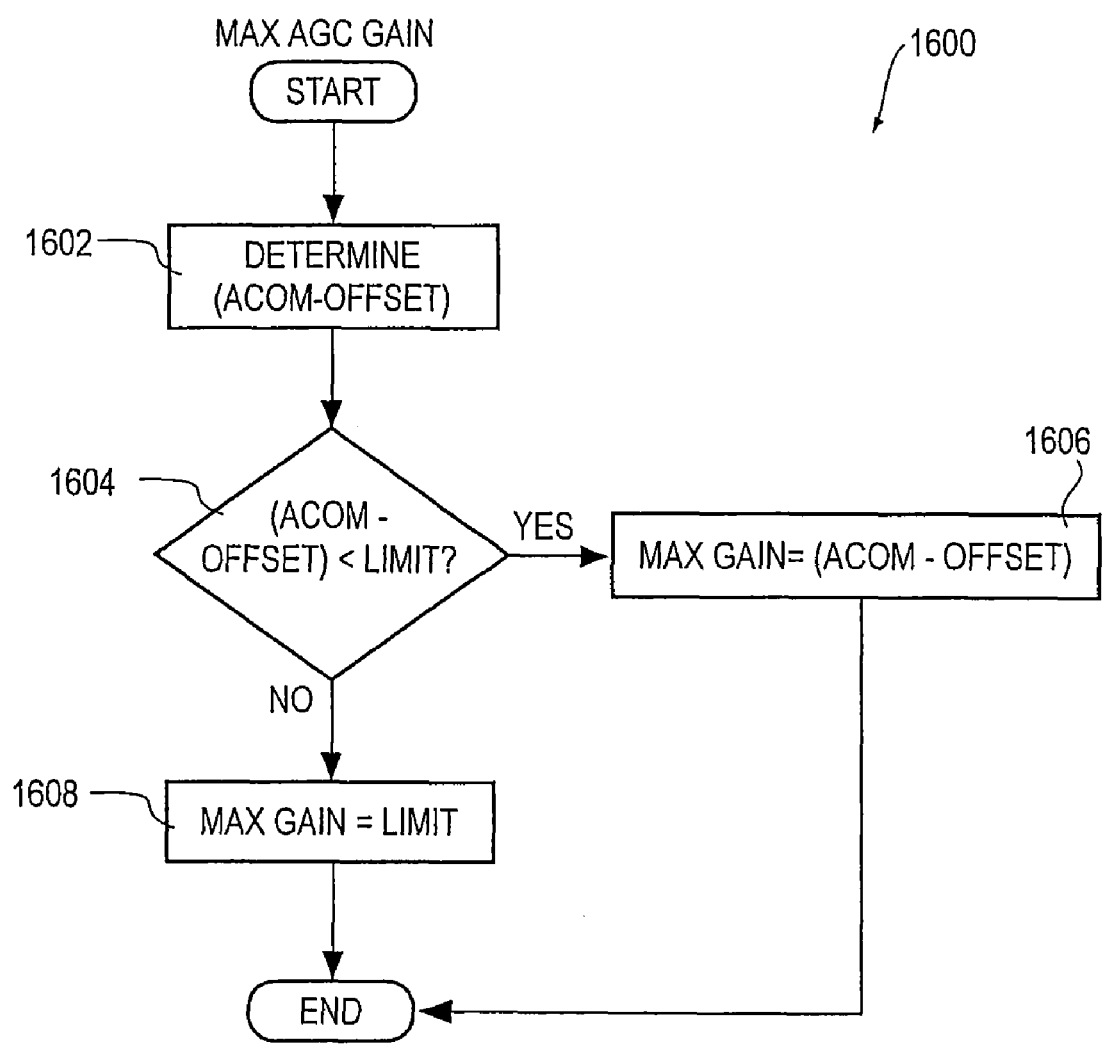
FIG. 16 is a representative flow chart, according to one aspect of the present invention, for determining a maximum AGC gain.

Still another series of steps might be employed to limit the maximum AGC gain. FIG. 16 shows the process of determining a maximum AGC gain. In step 1602, a certain offset is subtracted from Acom. For the present example, this offset is approximately 6 dB. Step 1604 next inquires whether this quantity (Acom−offset) is less than a certain gain limit. If yes, then the maximum AGC gain is set to (Acom−offset). If no, then the AGC gain is set to the gain limit. For the purposes of the present example, this gain limit is set to approximately 24 dB. Accordingly, by applying this last series of steps, the gain can be limited to a level that will provide a stable system.

Although a preferred embodiment of the present invention has been described, it should not be construed to limit the scope of the appended claims. For example, the present invention is applicable to any real-time media, such as audio and video, in addition to the voice media illustratively described herein. Also, the invention is applicable to the recovery of any type of lost data elements, such as packets, in addition to the application to late frames described herein. Those skilled in the art will understand that various modifications may be made to the described embodiment. Moreover, to those skilled in the various arts, the invention itself herein will suggest solutions to other tasks and adaptations for other applications. It is therefore desired that the present embodiments be considered in all respects as illustrative and not restrictive, reference being made to the appended claims rather than the foregoing description to indicate the scope of the invention.

What is claimed is:

1. A communication signal transceiver comprising:
an ingress echo canceller device in an ingress signal path of the system, the ingress echo canceller deice being operable to receive an ingress communication signal and generate information pertaining to the ingress communication signal;
an ingress gain control device in the ingress signal path, the ingress gain control device being coupled to the ingress echo canceller via a feedforward connection, the ingress gain control device being operable to receive the information pertaining to the ingress communication signal from the ingress echo canceller device via the feedforward connection, the ingress gain control device being operable to adjust a gain provided to the signal based on the information received from the ingress echo canceller device;
an egress echo canceller device in an egress signal path of the system, the egress echo canceller deice being operable to receive an egress communication signal and generate information pertaining to the egress communication signal; and
an egress gain control device in the egress signal path, the egress gain control device being coupled to the egress echo canceller via an information connection, the egress gain control device being operable to receive the information pertaining to the egress communication signal from the egress echo canceller device via the information connection, the egress gain control device being operable to adjust a gain provided to the egress communication signal based on the information received from the egress echo canceller device.

2. The transceiver of claim 1, wherein the information pertaining to the ingress communication signal includes statistical performance information from the ingress echo canceller device, and wherein the information pertaining to the egress communication signal includes statistical performance information from the egress echo canceller device.

3. The transceiver of claim 2, wherein the statistical performance information includes at least a loss estimate.

4. The transceiver of claim 3, wherein the loss estimate includes at least an echo return loss component and an echo return loss enhancement component.

5. The transceiver of claim 1, wherein the information connection between the egress echo canceller and the egress gain control is a feedforward connection.

\* \* \* \* \*